United States Patent
Kanai et al.

(10) Patent No.: US 7,812,681 B2
(45) Date of Patent: *Oct. 12, 2010

(54) DRIVER DEVICE, PHYSICAL QUANTITY MEASURING DEVICE, AND ELECTRONIC INSTRUMENT

(75) Inventors: Masahiro Kanai, Suwa (JP); Eitaro Otsuka, Fujimi-machi (JP); Naoki Yoshida, Suwa (JP); Akihiro Fukuzawa, Suwa (JP)

(73) Assignee: Seiko) Epson Corporation, Tokyo (JP)

( * ) Notice: Subject to any disclaimer, the term of this patent is extended or adjusted under 35 U.S.C. 154(b) by 388 days.

This patent is subject to a terminal disclaimer.

(21) Appl. No.: 11/907,483

(22) Filed: Oct. 12, 2007

(65) Prior Publication Data

US 2008/0087084 A1   Apr. 17, 2008

(30) Foreign Application Priority Data

Oct. 17, 2006  (JP)  ............................. 2006-282211
Sep. 14, 2007  (JP)  ............................. 2007-239568

(51) Int. Cl.
*H03B 5/36* (2006.01)

(52) U.S. Cl. .................... 331/160; 331/116 R

(58) Field of Classification Search .................. 331/160, 331/116 R
See application file for complete search history.

(56) References Cited

U.S. PATENT DOCUMENTS 5,041,800 A * 8/1991 Long et al. .................... 331/69
7,089,793 B2   8/2006 Yokoi et al.

FOREIGN PATENT DOCUMENTS

JP   A 2003-240556   8/2003
JP   A 2004-286503   10/2004

* cited by examiner

*Primary Examiner*—Joseph Chang
(74) *Attorney, Agent, or Firm*—Oliff & Berridge PLC

(57) ABSTRACT

An oscillation driver circuit includes a gain control amplifier which causes a vibrator to produce driving vibrations by controlling an oscillation amplitude in an oscillation loop, and a comparator which generates a synchronous detection reference signal based on a signal in the oscillation loop. The comparator has an output current limiting function. The oscillation driver circuit causes the vibrator to produce vibrations using an output from the comparator in a state in which the gain in an oscillation loop formed by the vibrator and the comparator is set to be larger than unity, and then causes the vibrator to produce the driving vibrations by controlling an oscillation amplitude in an oscillation loop formed by the vibrator and the gain control amplifier.

15 Claims, 12 Drawing Sheets

DRIVER DEVICE, PHYSICAL QUANTITY MEASURING DEVICE, AND ELECTRONIC INSTRUMENT

Japanese Patent Application No. 2006-282211 filed on Oct. 17, 2006 and Japanese Patent Application No. 2007-239568 filed on Sep. 14, 2007 are hereby incorporated by reference by their entirety.

BACKGROUND OF THE INVENTION

The present invention relates to a driver device which causes a vibrator to produce driving vibrations, a physical quantity measuring device (e.g. vibrating gyroscope) using the driver device, and an electronic instrument.

Gyroscopes are classified as a rotating gyroscope, a vibrating gyroscope, and the like depending on the method of detecting the force applied to an object. In particular, the vibrating gyroscope is considered to be advantageous for reducing size and cost from the viewpoint of the constituent elements and the like. As a vibrating gyrosensor which detects an angular velocity applied to an object, a piezoelectric vibrating gyrosensor is known which excites a crystal or a piezoelectric element advantageous for increasing reliability and reducing size. The piezoelectric vibrating gyrosensor utilizes a phenomenon in which a Coriolis force occurs perpendicularly to vibrations when an angular velocity is applied to a vibrating object.

For example, a vibrating gyrosensor which detects an angular velocity causes a physical quantity transducer (vibrator) to produce driving vibrations in a specific direction. When an angular velocity is applied to the vibrator, a Coriolis force occurs perpendicularly to driving vibrations to produce detection vibrations. Since the detection vibrations occur perpendicularly to the driving vibrations, a detection signal (signal component due to detection vibrations) differs in phase from a driving signal (signal component due to driving vibrations) by 90 degrees. The detection signal can be synchronously detected separately from the driving signal utilizing the above phenomenon, for example.

A reduction in size and an increase in reliability of the vibrating gyrosensor can be achieved using a crystal vibrator.

The vibrating gyrosensor is used in a wide variety of applications, such as shake detection for a video camera or a digital camera, positioning using a global positioning system (GPS) for a car navigation system, and aircraft or robot position detection.

The vibrating gyrosensor used in these applications is driven by a battery. Therefore, it is necessary to increase the life of the battery by reducing the power consumption of the vibrating gyrosensor as much as possible. In this case, it is preferable to stop supplying power to the vibrating gyrosensor when an angular velocity or the like is not detected and to supply power to the vibrating gyrosensor from the battery only when using the vibrating gyrosensor. This makes it necessary to cause the vibrating gyrosensor to perform a normal operation within a short period of time after activation.

Specifically, it is important to cause the vibrating gyrosensor to promptly transition to an operation state in which the gyrosensor can detect a physical quantity (steady oscillation state) when supplying power (during oscillation startup). For example, when using a vibrator such as a crystal vibrator which has a high Q value and requires a long time until stable oscillations are achieved after supplying power, it is very difficult to achieve a high-speed transition to the steady oscillation state.

In order to reduce power consumption, it is preferable to suspend the operation of an unnecessary circuit when a physical quantity such as an angular velocity need not be detected. When providing a low power consumption mode (sleep mode), the circuit must be designed to enable a high-speed recovery from the low power consumption mode (sleep mode) to the normal operation mode.

JP-A-2004-286503 and JP-A-2003-240556 disclose technologies for reducing the startup time of such a vibrating gyrosensor, for example. JP-A-2004-286503 discloses technology in which a CR oscillation circuit or a ring oscillator is provided in an oscillation loop so that the oscillation amplitude is increased using an amplifier immediately after activation. JP-A-2003-240556 discloses technology in which a resistor is provided in series with a crystal vibrator to reduce the period of time until the signal from the vibrator is stabilized.

A vibrating gyrosensor driver device must cause the vibrator to constantly vibrate (oscillate) at a resonance frequency in order to stably detect the angular velocity applied to the vibrator. The driver device also must cause the vibrator to oscillate within a short time to start a normal operation. Furthermore, it is preferable to form the driver device using a small circuit with low power consumption in order to increase the life of the battery at low cost.

On the other hand, if the vibrator is formed of a crystal having a high Q value and is sealed in a package under vacuum, the driving Q value of the vibrator increases to a large extent. Therefore, the time (startup time) elapsed until the signal from the vibrator is stabilized increases when causing the vibrator to produce driving vibrations.

A sleep mode may be provided as the operation mode of the driver device aiming at reducing its power consumption so that the operation of the circuit is suspended when unnecessary and the normal operation is recovered quickly when necessary. In particular, when causing a crystal vibrator to oscillate, the oscillation startup time increases due to a high Q value. Therefore, it is necessary to at least cause the crystal vibrator to continuously oscillate in order to reduce the normal operation recovery time.

It is necessary to prevent mechanical destruction of the vibrator by controlling energy (current) for causing the vibrator to produce mechanical vibrations. However, when the operation of an unnecessary circuit is terminated in the sleep mode in order to reduce power consumption, the oscillation amplitude in the oscillation loop is not controlled. In this case, an excessive current may flow through the vibrator, whereby the vibrator may break. This causes the reliability of the gyrosensor to deteriorate. Therefore, it is necessary to provide a circuit which monitors a signal in the oscillation loop and to operate this circuit in the sleep mode.

According to the technology disclosed in JP-A-2004-286503, when causing the crystal vibrator to oscillate at a frequency close to its driving frequency, the areas of the capacitor and the resistor of the CR oscillation circuit must be increased. This results in an increase in size and cost of the vibrating gyroscope (vibrating gyrosensor). According to the technology disclosed in JP-A-2004-286503, it is difficult to cause the crystal oscillator with a high Q value to promptly operate at its driving frequency since the crystal oscillator is driven at another frequency during startup. Therefore, the period of time until stable oscillations are achieved increases when affected by a manufacturing variation and the like. Therefore, the technology disclosed in JP-A-2004-286503 results in an increase in startup time and power consumption, even if a sleep mode is provided.

According to the technology disclosed in JP-A-2003-240556, it is necessary to insert a resistor. In general, when incorporating a resistor in an integrated circuit device, it is difficult to provide the vibrator with desired energy due to a large manufacturing variation of the resistor. According to the technology disclosed in JP-A-2003-240556, a gain loss occurs since the energy applied to the vibrator is divided by the resistor. Therefore, the technology disclosed in JP-A-2003-240556 results in an increase in startup time and power consumption due to a gain loss, even if a sleep mode is provided. Even if the driver device is set in a sleep mode, power consumption increases when adjusting the level of the oscillation signal in order to prevent destruction of the vibrator.

SUMMARY

According to one aspect of the invention, there is provided a driver device which is connected with a vibrator to form an oscillation loop and causes the vibrator to produce driving vibrations when measuring a physical quantity using an output signal obtained by synchronously detecting a detection signal output from the vibrator, the driver device comprising:

a gain control amplifier which causes the vibrator to produce the driving vibrations by controlling an oscillation amplitude in the oscillation loop; and a comparator which generates a synchronous detection reference signal based on a signal in the oscillation loop;

the driver device causing the vibrator to produce vibrations using an output from the comparator in a state in which a gain in an oscillation loop formed by the vibrator and the comparator is set to be larger than unity, and then causing the vibrator to produce the driving vibrations by controlling an oscillation amplitude in an oscillation loop formed by the vibrator and the gain control amplifier; and the comparator having an output current limiting function.

According to another aspect of the invention, there is provided a physical quantity measuring device for measuring a physical quantity corresponding to a detection signal output from a vibrator based on driving vibrations produced by the vibrator and the physical quantity to be measured, the physical quantity measuring device comprising:

a vibrator;

the driver device as defined in claim 1 which causes the vibrator to produce driving vibrations; and a detection device which detects an output signal corresponding to the physical quantity based on the detection signal, the detection device including a synchronous detector which synchronously detects the detection signal based on the output from the comparator.

DETAILED DESCRIPTION OF THE EMBODIMENT

Figure 1:
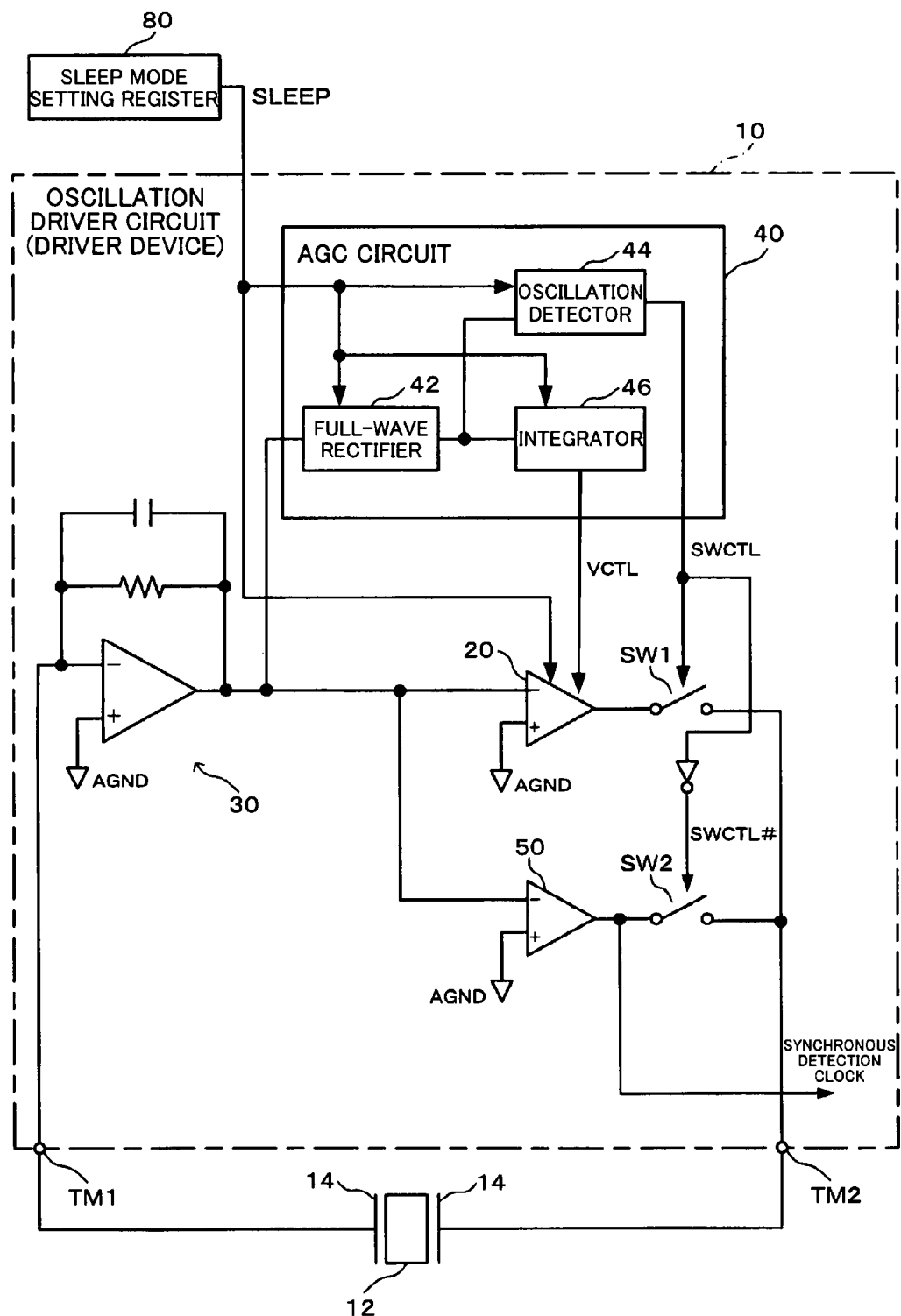
FIG. 1 is a circuit block diagram showing a configuration example of an oscillation driver circuit according to one embodiment of the invention.

At least one aspect of the invention may provide a driver device which can reduce the oscillation startup time without increasing the circuit scale and can effectively prevent destruction of a vibrator during oscillation startup or in a sleep mode without increasing circuit complexity and power consumption, a physical quantity measuring device and an electronic instrument using the driver device.

Aspects of the invention are as follows, for example.

(1) According to one embodiment of the invention, there is provided a driver device which is connected with a vibrator to form an oscillation loop and causes the vibrator to produce driving vibrations when measuring a physical quantity using an output signal obtained by synchronously detecting a detection signal output from the vibrator, the driver device comprising:

a gain control amplifier which causes the vibrator to produce the driving vibrations by controlling an oscillation amplitude in the oscillation loop; and a comparator which generates a synchronous detection reference signal based on a signal in the oscillation loop;

the driver device causing the vibrator to produce vibrations using an output from the comparator in a state in which a gain in an oscillation loop formed by the vibrator and the comparator is set to be larger than unity, and then causing the vibrator to produce the driving vibrations by controlling an oscillation amplitude in an oscillation loop formed by the vibrator and the gain control amplifier; and the comparator having an output current limiting function.

According to this embodiment, when measuring a physical quantity using the output signal obtained by synchronously detecting the detection signal output from the vibrator, the driver device is used to form an oscillation loop together with the vibrator and cause the vibrator to produce driving vibrations. The signal in the oscillation loop is amplified using the comparator which generates the synchronous detection reference signal during oscillation startup, and the oscillation loop is switched when a steady oscillation state has been achieved. The oscillation amplitude in the oscillation loop is then controlled using the gain control amplifier.

A steady oscillation state can be more promptly achieved by setting the gain in the oscillation loop to be larger than unity utilizing the comparator during oscillation startup.

The output voltage of the comparator generally swings to the maximum between power supply voltages (including a voltage which may be considered to be the power supply voltage). Therefore, the gain in the oscillation loop can be efficiently set to be larger than unity without providing an additional circuit by utilizing the output from the comparator for driving the vibrator. The comparator also serves as a synchronous detection reference clock signal generation circuit. This enables a high-speed oscillation startup and also enables a synchronous detection process for physical quantity measurement.

The comparator has the output current limiting function. When the vibrator is in a resonance state, only a current at a resonance frequency flows through the vibrator. Therefore, a current which flows through the vibrator is equal to the current supplied from the comparator having the output current limiting function. Accordingly, the amount of current flowing through the vibrator can be limited without controlling the oscillation amplitude using another circuit.

Specifically, although the output voltage of the comparator swings to the maximum between the power supply voltages, the amount of current supplied to the vibrator is automatically limited, thereby preventing destruction of the vibrator due to an excessive current supply during oscillation startup. This improves the reliability of the driver device and a physical quantity measuring device. Moreover, since the oscillation amplitude need not be controlled during oscillation startup, control and the configuration of the driver device can be simplified.

(2) In the driver device, when the driver device is set in a first operation mode for performing a normal operation, the driver device may cause the vibrator to produce vibrations using the output from the comparator in a state in which the gain in the oscillation loop formed by the vibrator and the comparator is set to be larger than unity, and then may cause the vibrator to produce the driving vibrations by controlling the oscillation amplitude in the oscillation loop formed by the vibrator and the gain control amplifier; and when the driver device is set in a second operation mode for performing a sleep operation, the driver device may cause the vibrator to produce the driving vibrations in the oscillation loop formed by the vibrator and the comparator.

According to this embodiment, the first and second operation modes are provided. The first operation mode is a normal operation mode. The second operation mode is a sleep mode. The term "sleep mode" refers to an operation mode in which some circuits are turned OFF to reduce power consumption (i.e., low power consumption mode). When the driver device is set in the first operation mode, the oscillation loop is driven using the comparator during oscillation startup, and a steady oscillation state is then achieved by driving the oscillation loop using the gain control amplifier.

When the driver circuit is set in the second operation mode (sleep mode), the driver circuit drives the oscillation loop using the comparator. This maintains a state in which the gain in the oscillation loop is larger than unity even in the sleep mode. Therefore, a prompt transition to a steady oscillation state can be achieved when the driver circuit transitions to the normal operation mode (first operation mode) from the sleep mode (second operation mode), whereby a delay due to transition (switching) can be minimized. Since the circuit section which controls the oscillation amplitude need not be operated in the second operation mode, the circuit section can be turned OFF. Therefore, a reduction in power consumption in the second operation mode and a high-speed oscillation startup (high-speed transition to steady oscillation state) when the second operation mode has been cancelled can be achieved in combination.

(3) The driver device may comprise:

a gain control circuit which controls a gain of the gain control amplifier based on an oscillation signal in the oscillation loop;

wherein, when the driver device is set in the second operation mode, the driver device may disable the operations of the gain control amplifier and the gain control circuit without disabling the operation of the comparator.

According to this embodiment, when the driver device is set in the first operation mode (normal operation mode), the signal in the oscillation loop is amplified using the comparator which generates the synchronous detection reference signal during oscillation startup, and the oscillation loop is switched when the steady oscillation state has been achieved. The oscillation amplitude in the oscillation loop is then controlled using the gain control amplifier. This accelerates the synchronous detection process and oscillation startup. When the driver device is set in the second operation mode (sleep mode), the oscillation state is maintained in the oscillation loop formed by the vibrator and the comparator, and the operations of the gain control amplifier and the gain control circuit are suspended. Therefore, a reduction in power consumption in the second operation mode and a high-speed oscillation startup when the second operation mode has been canceled can be achieved in combination.

(4) In the driver device, the output of the gain control amplifier may be controlled to have an output level which does not cause destruction of the vibrator when the driver device transitions to the first operation mode from the second operation mode.

According to this embodiment, even if the operation of the circuit which controls the output (gain) of the gain control amplifier is suspended in the second operation mode, the output of the gain control amplifier is reliably controlled to have an output level which does not cause destruction of the vibrator when the driver device transitions to the first operation mode. This reliably prevents a situation in which the vibrator is destroyed.

(5) The driver device may comprise:

an oscillation detector which detects a signal from the vibrator;

wherein the driver device may switch the oscillation loop from the oscillation loop formed by the vibrator and the comparator to the oscillation loop formed by the vibrator and the gain control amplifier based on the detection result of the oscillation detector.

According to this embodiment, the oscillation loop can be switched based on the oscillation detection result of the oscillation detector. The switching element can be switch-controlled utilizing the signal detection result from the vibrator generally used for oscillation control of the oscillation loop. Therefore, the synchronous detection process and high-speed oscillation startup can be achieved without increasing the circuit scale.

(6) In the driver device, the driver device may switch the oscillation loop from the oscillation loop formed by the vibrator and the comparator to the oscillation loop formed by the vibrator and the gain control amplifier on condition that the oscillation detector has detected that a direct-current voltage obtained by converting a current flowing through the vibrator has reached a given threshold voltage.

According to this embodiment, an oscillation loop to be used can be determined by converting a current flowing through the vibrator into a voltage and comparing the voltage with the threshold value.

(7) In the driver device, the driver device may cause the vibrator to produce the driving vibrations using the output from the comparator when the oscillation loop is formed by the vibrator and the comparator, and may use the output from the comparator as a synchronous detection clock signal for generating the output signal when the oscillation loop is formed by the vibrator and the gain control amplifier.

According to this embodiment, the comparator also serves as a synchronous detection reference clock signal generation circuit. Specifically, the comparator (synchronous detection reference signal generation circuit) is provided with the output current limiting function, and is also utilized to drive the oscillation loop. Therefore, a high-speed oscillation startup and the synchronous detection process can be achieved without increasing the circuit scale.

(8) In the driver device, the polarity of the output from the gain control amplifier with respect to a reference potential may be the same as the polarity of the output from the comparator with respect to the reference potential.

According to this embodiment, since it is unnecessary to provide a circuit which reverses the polarity, an increase in circuit scale can be suppressed.

(9) In the driver device, when the comparator is connected with a high-potential-side power supply and a low-potential-side power supply, the output current limiting function may be a function of limiting a current flowing through a current path connected to at least one of the high-potential-side power supply and the low-potential-side power supply.

According to this embodiment, the output current limiting function of the comparator can be easily realized.

(10) In the driver device,
the comparator having the output current limiting function may include:
an output-stage circuit including a high-potential power supply side first output transistor and a low-potential power supply side second output transistor;
a comparator circuit which compares a signal in the oscillation loop with a given reference voltage and drives the second output transistor using an output indicating the comparison result;
a current-mirror circuit which includes the first output transistor as a constituent element; and
a current source circuit which generates an input current of the current-mirror circuit; and
wherein the first output transistor may operate as an output-side transistor of the current-mirror circuit, whereby the amount of current flowing through the first output transistor may be controlled by the current generated by the current source circuit.

The amount of current flowing through the high-potential power supply side first output transistor can be controlled using the current mirror. Therefore, the output current of the comparator can be limited using a circuit having a simple configuration.

(11) In the driver device,
the comparator having the output current limiting function may include:
an output-stage circuit including a high-potential power supply side first output transistor and a low-potential power supply side second output transistor;
a comparator circuit which compares a signal in the oscillation loop with a given reference voltage and drives the first output transistor using an output indicating the comparison result;
a current-mirror circuit which includes the second output transistor as a constituent element; and
a current source circuit which generates an input current of the current-mirror circuit; and wherein the second output transistor may operate as an output-side transistor of the current-mirror circuit, whereby the amount of current flowing through the second output transistor may be controlled by the current generated by the current source circuit.

The amount of current flowing through the low-potential power supply side second output transistor can be controlled using the current mirror. Therefore, the output current of the comparator can be limited using a circuit having a simple configuration.

(12) In the driver device,
the vibrator may be a capacitive-coupling vibrator; and
the gain control amplifier may cause the vibrator to produce the driving vibrations by applying a rectangular-wave driving signal to the vibrator.

The rectangular-wave drive method has an advantage in that the variation in the driving signal is small. Moreover, since the voltage amplitude is easily controlled, the circuit configuration can be simplified, whereby the circuit scale can be reduced. When using the capacitive-coupling vibrator (vibrator in which a direct-current blocking capacitor lies in the signal path in the internal equivalent circuit), an arbitrary potential may be used as the direct-current potential of the oscillation loop, whereby the degrees of freedom relating to the circuit configuration are increased. A piezoelectric element can be given as an example of the capacitive-coupling vibrator (capacitive vibrator).

(13) According to another embodiment of the invention, there is provided a physical quantity measuring device for measuring a physical quantity corresponding to a detection signal output from a vibrator based on driving vibrations produced by the vibrator and the physical quantity to be measured, the physical quantity measuring device comprising:
a vibrator;
the driver device as defined in claim 1 which causes the vibrator to produce driving vibrations; and
a detection device which detects an output signal corresponding to the physical quantity based on the detection signal, the detection device including a synchronous detector which synchronously detects the detection signal based on the output from the comparator.

As described above, the driver device according to the embodiment of the invention can reduce the oscillation startup time without increasing the circuit scale and can effectively prevent destruction of the vibrator during oscillation startup or in the sleep mode without increasing circuit complexity and power consumption. Therefore, the physical quantity measuring device utilizing the driver device according to the invention also has advantages in that a reduction in size, an increase in performance, a reduction in power consumption, and an increase in reliability can be achieved.

(14) In the physical quantity measuring device, the detection device may include a phase shifter which adjusts phases of the output from the comparator and the detection signal.

According to the driver device according to the embodiment of the invention, the phase can be adjusted corresponding to a change in phase during a weak detection signal detection process. As a result, the physical quantity measuring device according to this embodiment can achieve a highly accurate phase adjustment while preventing an increase in circuit scale.

(15) According to a further embodiment of the invention, there is provided an electronic instrument comprising the above physical quantity measuring device.

This contributes to reducing size and power consumption of an electronic instrument which performs a given process using the physical quantity measurement results. Moreover, the above driver device can prevent destruction of the vibrator to exhibit high reliability, and can reduce the oscillation startup time without increasing the circuit scale when recovering from the sleep mode or causing oscillations. Therefore, the electronic instrument utilizing the driver device according to the invention also has advantages in that a reduction in size, an increase in performance, a reduction in power consumption, and an increase in reliability can be achieved.

Embodiments of the invention are described below in detail with reference to the drawings. Note that the embodiments described below do not in any way limit the scope of the invention laid out in the claims. Note that all elements of the embodiments described below should not necessarily be taken as essential requirements for the invention.

First Embodiment

FIG. 1 is a block diagram showing a configuration example of an oscillation driver circuit (driver device) according to this embodiment. The oscillation driver circuit (driver device) according to this embodiment is used to measure a physical quantity using an output signal obtained by synchronously detecting a detection signal output from a vibrator based on driving vibrations produced by the vibrator and the physical quantity to be measured.

Configuration and Operation of Oscillation Driver Device

An oscillation driver circuit 10 includes first and second connection terminals TM1 and TM2 (electrodes or pads). A vibrator 12 is inserted between the first and second connection terminals outside the oscillation driver circuit 10. An excitation means 14 is attached to the vibrator 12. The excitation means 14 is connected with the oscillation driver circuit 10 to form an oscillation loop. An oscillation starts in a state in which the gain of a driver in the oscillation driver circuit 10 is large (i.e., the gain is larger than unity). In this state, only noise is input to the driver. The noise contains wave motions at a wide range of frequencies including the natural resonance frequency of the desired driving vibrations. The noise is input to the vibrator 12.

The vibrator 12 is formed of a piezoelectric single crystal as described later, for example. A signal containing a large amount of wave motions at the desired natural resonance frequency is output by the frequency filtering effect of the vibrator 12, and input to the driver. The above operation is repeated in the oscillation loop so that the percentage of the signal at the desired natural resonance frequency increases, whereby the amplitude of the signal input to the driver increases.

In the steady oscillation state, the output current from the vibrator 12 is converted into a voltage value using a current-voltage converter 30, and the oscillation amplitude in the oscillation loop is controlled using an auto gain control (AGC) circuit (gain control circuit in a broad sense) 40 based on the voltage value. This causes the gain (loop gain) while the signal goes around the oscillation loop to become unity, whereby the vibrator 12 stably oscillates.

Stable oscillations of the vibrator are indispensable for the measurement of the physical quantity. Specifically, if the amplitude of the driving signal produced by the vibrator is not constant, the output signal from the vibrator does not become constant, whereby the physical quantity cannot be accurately measured.

It is also indispensable to accelerate the oscillation startup of the vibrator in order to reduce the power consumption of the system including the vibrator and the oscillation driver circuit. Specifically, oscillations can be produced only when required by promptly obtaining stable oscillations, whereby an operation period in which power is unnecessarily consumed can be reduced.

In this embodiment, the oscillation driver circuit 10 utilizes a comparator 50 as the driver during oscillation startup, and utilizes a gain control amplifier (hereinafter abbreviated as GCA) 20 as the driver in the steady oscillation state. The comparator 50 according to this embodiment has an output current limiting function. When the comparator 50 is connected with a high-potential-side power supply and a low-potential-side power supply, the output current limiting function of the comparator 50 may be referred to as a function of limiting a current flowing through the current path connected to at least one of the high-potential-side power supply and the low-potential-side power supply.

In this embodiment, the oscillation driver circuit 10 includes the comparator 50 provided in parallel with the GCA 20. The oscillation driver circuit 10 includes a first switching element SW1 inserted between the output of the GCA 20 and the second connection terminal TM2. The first switching element SW1 is ON/OFF-controlled using a switch control signal SWCTL. The oscillation driver circuit 10 includes a second switching element SW2 inserted between the output of the comparator 50 and the second connection terminal TM2. The second switching element SW2 is ON/OFF-controlled using a switch control signal SWCTL#. The switch control signal SWCTL# is an inversion signal of the switch control signal SWCTL.

The oscillation driver circuit 10 can output the output from the comparator 50 as a synchronous detection clock signal (synchronous detection reference signal).

The oscillation driver circuit 10 has a normal mode for performing a normal operation (first operation mode in a broad sense) and a sleep mode for performing a sleep operation (second operation mode in a broad sense) as operation modes in order to reduce power consumption. A sleep mode setting register 80 is provided inside or outside the oscillation driver circuit 10. A control circuit (not shown) which controls the oscillation driver circuit 10 sets control data in the sleep mode setting register 80. The oscillation driver circuit 10 operates in an operation mode corresponding to the control data set in the sleep mode setting register 80. For example, when "0" is set in the sleep mode setting register 80, the oscillation driver circuit 10 operates in the normal mode. For example, when "1" is set in the sleep mode setting register 80, the oscillation driver circuit 10 operates in the sleep mode.

A sleep control signal SLEEP corresponding to the control data set in the sleep mode setting register 80 is supplied to the GCA 20 and the AGC circuit 40. When the oscillation driver circuit 10 operates in the sleep mode, the operations of the GCA 20 and the AGC circuit 40 are suspended. In this embodiment, when the oscillation driver circuit 10 operates in the sleep mode, the current-voltage converter 30 and the comparator 50 operate without being disabled (i.e., enabled state is maintained).

The AGC circuit 40 includes a full-wave rectifier 42, an oscillation detector 44, and an integrator 46. The full-wave rectifier 42 converts the voltage value converted by the current-voltage converter 30 into a voltage value as a direct-current signal. The oscillation detector 44 detects whether or not the oscillation loop including the vibrator 12 is in an oscillation state based on the voltage value converted by the full-wave rectifier 42, and generates a switch control signal SWCTL corresponding to the detection result.

For example, the oscillation detector 44 compares the voltage value converted by the full-wave rectifier 42 with a given reference voltage value, and generates the switch control signal SWCTL based on the comparison result. The integrator 46 generates a control signal VCTL for the GCA 20 to control oscillations in the oscillation loop based on the integration result of the voltage value converted by the full-wave rectifier 42.

For example, the integrator 46 integrates the voltage value converted by the full-wave rectifier 42 to determine the level of the direct-current component, compares the determined level with a given reference signal level, and generates the control signal VCTL based on the comparison result. For example, the high-potential-side power supply voltage of the circuit (output circuit) in the output stage (final stage) of the GCA 20 is controlled based on the control signal VCTL.

Specifically, the sleep control signal SLEEP is supplied to the full-wave rectifier 42, the oscillation detector 44, and the integrator 46. The operations of the full-wave rectifier 42, the oscillation detector 44, and the integrator 46 are suspended when the sleep mode is designated by the sleep control signal SLEEP. The full-wave rectifier 42, the oscillation detector 44, and the integrator 46 operate when the normal mode is designated by the sleep control signal SLEEP.

In this embodiment, the oscillation loop including the vibrator 12 and the GCA 20 and the oscillation loop including the vibrator 12 and the comparator 50 are switched by controlling the first and second switching elements SW1 and SW2 when the normal mode is set in the sleep mode setting register 80. In this embodiment, oscillations continue in the oscillation loop including the vibrator 12 and the comparator 50 when the sleep mode is set in the sleep mode setting register 80.

The AGC circuit 40 performs switch control of the first and second switching elements SW1 and SW2 and oscillation amplitude control of the GCA 20.

Figure 2A:
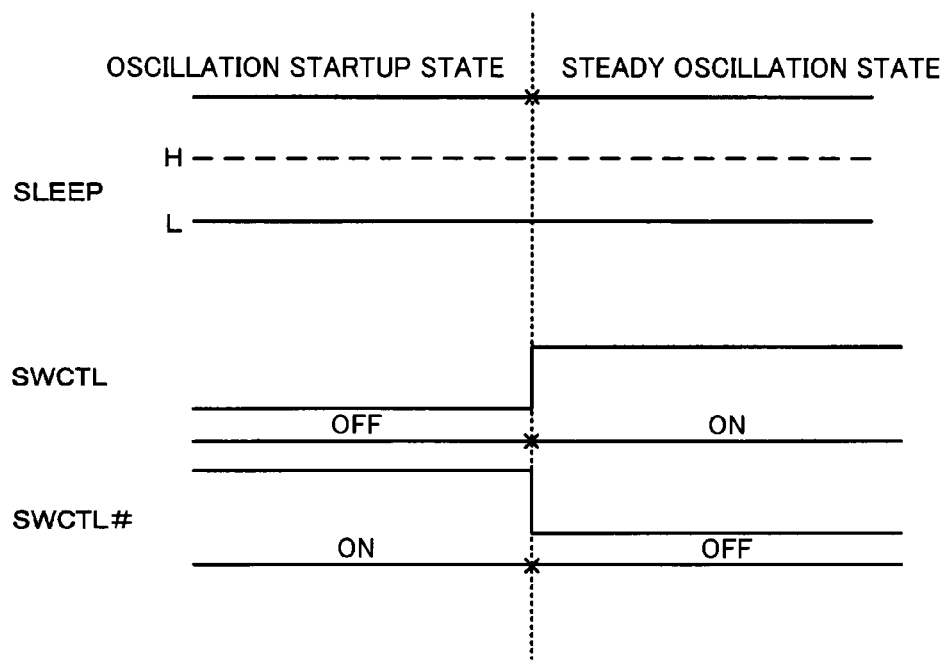
FIGS. 2A and 2B are timing diagrams showing an example of a sleep control signal and switch control signals shown in FIG. 1.
Figure 2B:
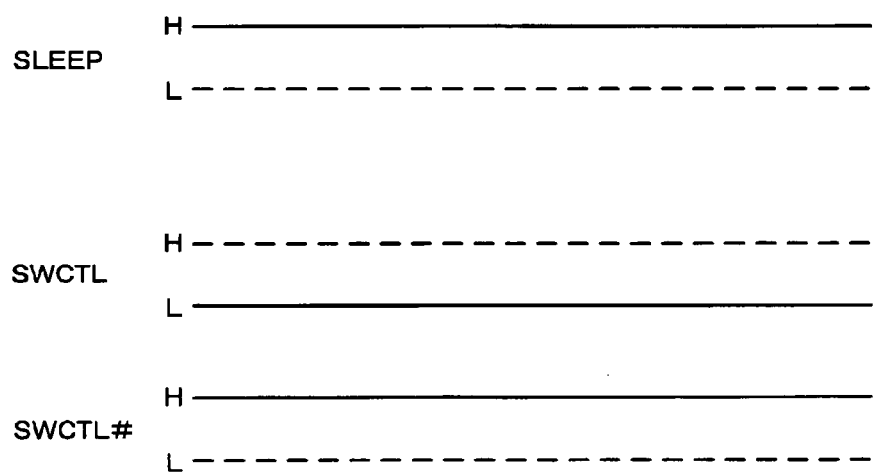

FIGS. 2A and 2B are timing waveform diagrams of the sleep control signal SLEEP and the switch control signals SWCTL and SWCTL#.

FIG. 2A is a timing waveform diagram in the normal mode, and FIG. 2B is a timing waveform diagram in the sleep mode.

In FIG. 2A, the oscillation driver circuit 10 operates in the normal mode when the sleep control signal SLEEP is set at the L level. During oscillation startup such as immediately after supplying power, the oscillation detector 44 of the AGC circuit 40 detects that the voltage value obtained by converting the current signal from the vibrator 12 is lower than the given reference voltage value, and the oscillation detector 44 generates the switch control signal SWCTL set at the L level. This causes the first switching element SW1 to be turned OFF and causes the second switching element SW2 to be turned ON.

In this case, when the level of the input signal of the comparator 50 has exceeded a given threshold value, the comparator 50 amplifies the input signal by a very large gain to set the gain in the oscillation loop to be larger than unity. As a result, the vibrator 12 is caused to produce driving vibrations during the oscillation startup state so that the gain in the oscillation loop including the vibrator 12 and the comparator 50 is larger than unity and the phase in the oscillation loop is 360×n (n is an integer).

When the oscillation detector 44 has detected that the voltage value obtained by converting the current signal from the vibrator 12 is higher than the given reference voltage value, the oscillation detector 44 generates the switch control signal SWCTL set at the H level. This causes the first switching element SW1 to be turned ON and causes the second switching element SW2 to be turned OFF.

In this case, the oscillation amplitude in the oscillation loop is controlled by the GCA 20 based on the control signal VCTL from the AGC circuit 40 so that the gain in the oscillation loop becomes unity. As a result, the oscillation startup state is terminated and a transition to the steady oscillation state occurs. In the steady oscillation state, the vibrator 12 is caused to produce driving vibrations so that the gain in the oscillation loop including the vibrator 12 and the GCA 20 is unity and the phase in the oscillation loop is 360×n.

In this embodiment, the oscillation loop can be switched from the oscillation loop formed by the vibrator 12 and the comparator 50 to the oscillation loop formed by the vibrator 12 and the GCA 20 based on the detection result of the oscillation detector 44. Specifically, the above switch control is performed on condition that the oscillation detector 44 has detected that the direct-current voltage obtained by converting the current flowing through the vibrator 12 has reached the given threshold voltage. This enables the switching element to be switch-controlled utilizing the signal detection result from the vibrator 12 which is generally used for oscillation control of the oscillation loop, whereby a high-speed oscillation startup can be realized without increasing the circuit scale to a large extent.

In FIG. 2B, the oscillation driver circuit 10 operates in the sleep mode when the sleep control signal SLEEP is set at the H level. In this case, the oscillation detector 44 generates the switch control signal SWCTL set at the L level irrespective of whether the oscillation driver circuit 10 is in the oscillation startup state such as immediately after supplying power or the steady oscillation state. This causes the first switching element SW1 to be turned OFF and causes the second switching element SW2 to be turned ON. Specifically, the oscillation driver circuit 10 is set in the same state as the oscillation startup state in the normal mode shown in FIG. 2A.

In this case, when the level of the input signal of the comparator 50 has exceeded a given threshold value, the comparator 50 amplifies the input signal by a very large gain to set the gain in the oscillation loop to be larger than unity, as described above. As a result, the vibrator 12 is caused to produce driving vibrations during the oscillation startup state so that the gain in the oscillation loop including the vibrator 12 and the comparator 50 is larger than unity and the phase in the oscillation loop is 360×n (n is an integer). This makes it possible to suspend the operation of the AGC circuit 40 in the sleep mode to reduce power consumption.

In the sleep mode, the oscillation state continues in the oscillation loop used during the oscillation startup state in the normal mode. Therefore, a high-speed oscillation startup can be achieved when the operation mode transitions from the sleep mode to the normal mode. Therefore, a driver device can be provided which can reduce the oscillation startup time without increasing the circuit scale when the driver device can operate in the sleep mode.

When controlling the oscillation amplitude in the oscillation loop in the same manner as in this embodiment, a current flowing through the vibrator 12 changes. The vibrator 12 may break when an excessive current flows through the vibrator 12 (e.g. when the current exceeds a given threshold value). In particular, when disabling the operation of the AGC circuit 40 in the sleep mode in the same manner as in this embodiment, the amplitude of the oscillation signal in the oscillation loop is not controlled, whereby an excessive current may flow through the vibrator 12.

According to this embodiment, the comparator 50 has an output current limiting function. The term "output current limiting function" may be referred to as a limiter function for preventing the current flowing through the vibrator 12 from reaching or exceeding a given value, for example.

As a comparative example, a method may be considered in which a protective resistor is inserted into the oscillation loop without operating the AGC circuit, for example. However, this method has a problem in that the gain in the oscillation loop decreases in the steady oscillation state to increase power consumption. Moreover, the oscillation margin cannot be increased due to low accuracy of the resistance value of the protective resistor.

On the other hand, since the oscillation signal in the oscillation loop has a given amplitude during the operation in the sleep mode by providing the output current limiting function, a situation in which an excessive current flows through the vibrator 12 can be prevented without enabling the operation of the AGC circuit 40 while reducing power consumption.

As described above, when the oscillation driver circuit 10 is set in the normal mode, the oscillation driver circuit 10 causes the vibrator 12 to produce vibrations using the output from the comparator 50 in a state in which the gain in the oscillation loop formed by the vibrator 12 and the comparator 50 is set to be larger than unity, and then causes the vibrator 12 to produce driving vibrations by controlling the oscillation amplitude in the oscillation loop formed by the vibrator 12 and the GCA 20. Specifically, the output level of the comparator 50 swings between power supply voltages (including a voltage which is substantially considered to be the power supply voltage), whereby the oscillation loop is driven using a rectangular wave with a large voltage amplitude. This accelerates the transition from the oscillation startup state to the steady oscillation state.

When the oscillation driver circuit 10 is set in the sleep mode, the oscillation driver circuit 10 causes the vibrator 12 to produce driving vibrations in the oscillation loop formed by the vibrator 12 and the comparator 50. In the sleep mode, the oscillation loop is maintained in a state in which the gain is larger than unity. Therefore, a prompt transition to the steady oscillation state can be achieved when the operation mode is switched to the normal operation mode.

When the oscillation driver circuit 10 includes the AGC circuit 40 which controls the gain of the GCA 20 based on the oscillation signal in the oscillation loop, the oscillation driver circuit 10 can disable the operations of the GCA 20 and the AGC circuit 40 without disabling the operation the comparator 50 (i.e., while enabling the operation of the comparator 50) when the oscillation driver circuit 10 is set in the sleep mode.

Specifically, since the comparator 50 used in the sleep mode has the output current limiting function, it is unnecessary to control the oscillation amplitude by operating the AGC circuit 40 in the sleep mode. Since the AGC circuit 40 can be disabled in the sleep mode, an unnecessary operating current does not flow, whereby the power consumption of the circuit can be reduced.

Moreover, since the amount of output current of the comparator 50 is limited, a situation in which an excessive current flows through the vibrator 12 can be prevented. This prevents a problem in which the vibrator 12 vibrates to an extent exceeding a normal range, whereby destruction of the vibrator 12 can be prevented.

In this embodiment, the output from the comparator 50 is output as the synchronous detection clock signal in the steady oscillation state in the normal mode.

Therefore, when measuring the physical quantity using the output signal obtained by synchronously detecting the detection signal output from the vibrator 12 based on driving vibrations produced by the vibrator 12 and the physical quantity to be measured, the synchronous detection process and oscillation startup can be accelerated without increasing the circuit scale.

It is preferable that the comparator 50 have a gain as large as possible. This makes it possible to increase the loop gain in the oscillation loop formed in the oscillation startup state, whereby the oscillation startup time can be reduced.

Moreover, the accuracy of the synchronous detection clock signal output in the steady oscillation state can be increased.

It is preferable that the polarity (inversion and non-inversion) of the operational amplifier forming the GCA 20 be the same as the polarity of the operational amplifier forming the comparator 50. This makes it unnecessary to provide a circuit which reverses polarity, even if the oscillation loop is switched using the first and second switching elements SW1 and SW2, whereby an increase in the circuit scale can be suppressed.

Figure 3:
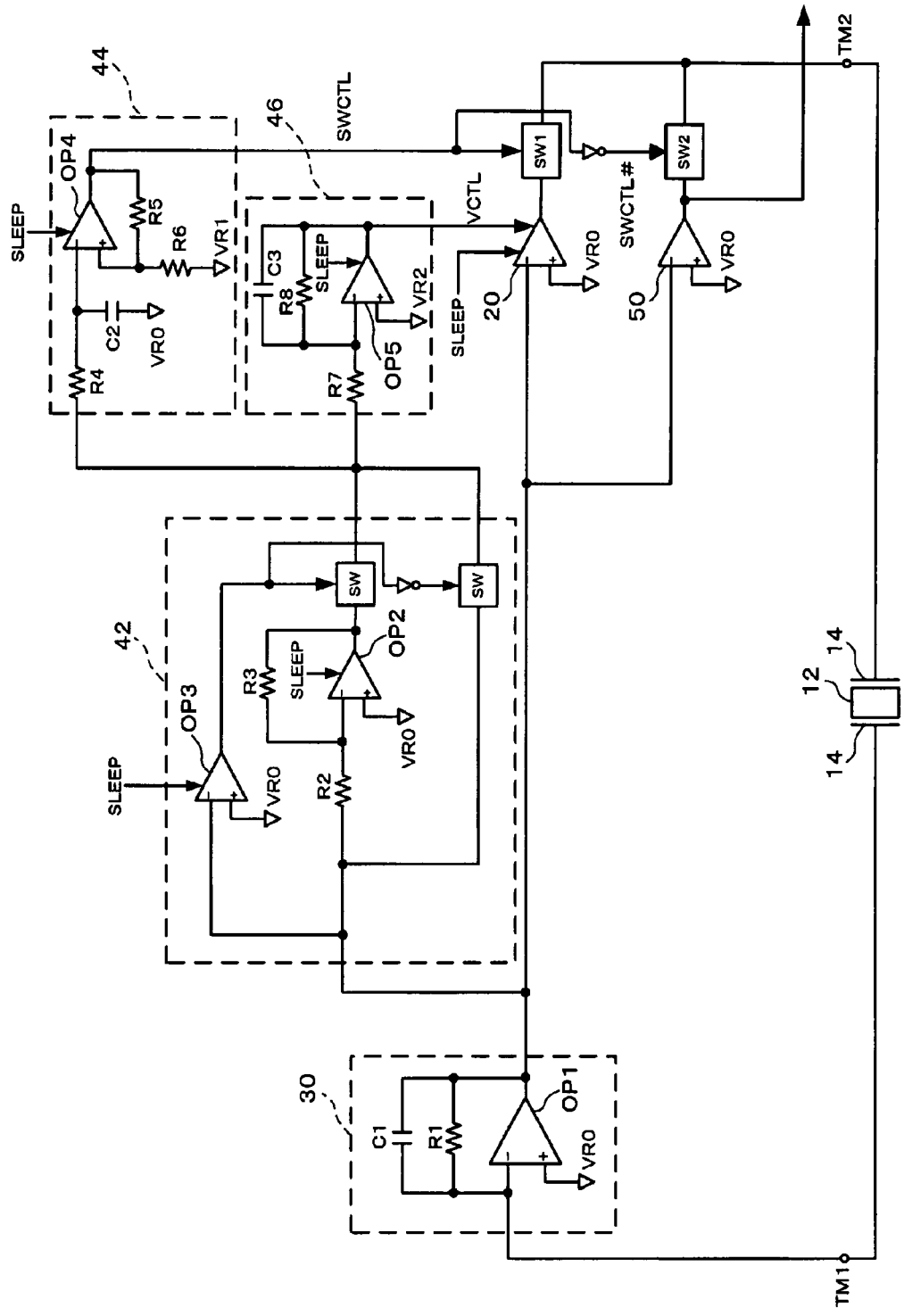
FIG. 3 is a view showing a circuit example of the oscillation driver circuit shown in FIG. 1.

FIG. 3 is a circuit diagram showing a configuration example of the oscillation driver circuit 10 shown in FIG. 1.

In FIG. 3, the same sections as in FIG. 1 are indicated by the same symbols. Description of these sections is appropriately omitted.

The current-voltage converter 30 includes an operational amplifier OP1, a feedback capacitor C1, and a feedback resistor R1. A given reference voltage VR0 is supplied to the non-inverting input terminal (+) of the operational amplifier OP1, and the first connection terminal TM1 is electrically connected with the inverting input terminal (−).

The full-wave rectifier 42 includes operational amplifiers OP2 and OP3 and resistors R2 and R3. The operational amplifier OP2 and the resistors R2 and R3 function as an inverting circuit. The operational amplifier OP3 functions as a comparator which compares the output voltage of the current-voltage converter 30 with the reference voltage VR0.

The full-wave rectifier 42 includes a switching element provided on the output side of the operational amplifier OP2, and a switching element which bypasses the input and the output of the full-wave rectifier 42. These switching elements are exclusively ON/OFF-controlled based on the output signal from the operational amplifier OP3.

When the sleep control signal SLEEP is set at the H level, the operations of the operational amplifiers OP2 and OP3 are stopped by terminating or limiting the operating currents of the operational amplifiers OP2 and OP3. When the sleep control signal SLEEP is set at the L level, the operational amplifiers OP2 and OP3 are caused to operate by generating the operating currents of the operational amplifiers OP2 and OP3.

The oscillation detector 44 includes a low pass filter (hereinafter abbreviated as "LPF") and an operational amplifier OP4. The LPF includes a resistor R4 and a capacitor C2. The resistor R4 is inserted in series between the input and the output of the LPF. One end of the capacitor C2 is electrically connected with the output node of the LPF. A reference voltage VR1 is supplied to the other end of the capacitor C2. The cut-off frequency of the LPF is $1/(2\pi \times C2 \times R4)$.

The output node of the LPF is connected with the inverting input terminal of the operational amplifier OP4. A resistor R5 is inserted as a feedback resistor between the output and the non-inverting input terminal of the operational amplifier OP4. The reference voltage VR1 is supplied to the non-inverting input terminal of the operational amplifier OP4 through a resistor R6. The output signal from the operational amplifier OP4 is output as the switch control signal SWCTL. When the sleep control signal SLEEP is set at the H level, the operation of the operational amplifier OP4 is stopped by terminating or limiting the operating current of the operational amplifier OP4. When the sleep control signal SLEEP is set at the L level, the operational amplifier OP4 is caused to operate by generating the operating current of the operational amplifier OP4.

The integrator 46 includes an operational amplifier OP5, resistors R7 and R8, and a capacitor C3. The capacitor C3 is connected as a feedback capacitor of the operational amplifier OP5. The resistor R8 is inserted as a feedback resistor of the operational amplifier OP5. The resistor R7 is inserted between the inverting input terminal of the operational amplifier OP5 and the output node of the full-wave rectifier 42. In the integrator 46, the gain is controlled while reducing the effects of the input voltage offset and the input current offset using the resistors R7 and R8. A reference voltage V R2 is supplied to the non-inverting input terminal of the operational amplifier OP5.

The integrator 46 functions as an LPF utilizing the capacitor C3 and the resistor R8. The cut-off frequency is $1/(2\pi \times C3 \times R8)$. The output signal from the operational amplifier OP5 is supplied to the GCA 20 as the control signal VCTL. When the sleep control signal SLEEP is set at the H level, the operation of the operational amplifier OP5 is stopped by terminating or limiting the operating current of the operational amplifier OP5. When the sleep control signal SLEEP is set at the L level, the operational amplifier OP5 is caused to operate by generating the operating current of the operational amplifier OP5.

The current which flows through the vibrator 12 in the oscillation startup state is indicated by Id, and the current which flows through the vibrator 12 in the steady oscillation state is indicated by Id'. The reference voltage VR2 is expressed by the following equation taking into account the smoothing by the current-voltage converter 30, $$VR2 = (Id \times R1 \times 2/\pi) + VR0 \qquad (1)$$

where, R1 indicates the resistance value of the feedback resistor of the current-voltage converter 30. Likewise, the reference voltage VR1 is expressed by the following equation.

$$VR1 = (Id' \times R1 \times 2/\pi) + VR0 \qquad (2)$$

Since Id'<Id, the reference voltage VR2 is higher than the reference voltage VR1. It is preferable that the reference voltages VR1 and VR2 have the following relationship with the reference voltage VR0.

$$VR0 < VR1 < VR2 \qquad (3)$$

When the sleep control signal SLEEP is set at the H level, the operation of the GCA 20 is stopped by terminating or limiting the operating current of the GCA 20. When the sleep control signal SLEEP is set at the L level, the GCA 20 is caused to operate by generating the operating current of the GCA 20.

Figure 4A:
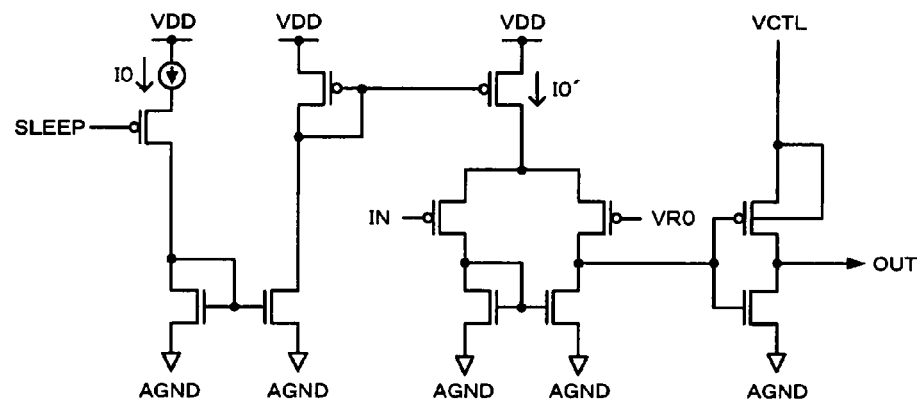
FIGS. 4A and 4B are circuit diagrams showing a configuration example of a GCA.
Figure 4B:
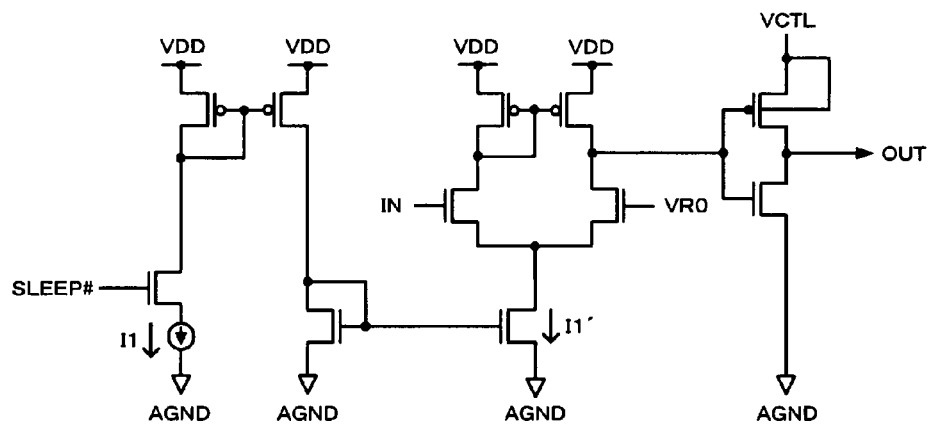

FIGS. 4A and 4B are circuit diagrams showing a configuration example of the GCA 20 shown in FIG. 3.

FIG. 4A shows a configuration example when forming the GCA 20 using a P-type differential amplifier, and FIG. 4B shows a configuration example when forming the GCA 20 using an N-type differential amplifier. In FIGS. 4A and 4B, the sleep control signal SLEEP# is an inversion signal of the sleep control signal SLEEP.

In FIG. 4A, a current I0 generated by a current source is supplied as an operating current I0' of the P-type differential amplifier through two current-mirror circuits. The voltage of the output node of the current-voltage converter 30 is supplied to the gate of one of a pair of P-type differential transistors of the P-type differential amplifier as an input signal IN. The reference voltage VR0 is supplied to the gate of the other P-type differential transistor of the P-type differential amplifier. The output voltage of the P-type differential amplifier is supplied to an output buffer. The output signal from the output buffer is supplied to one end of the first switching element SW1.

The high-potential-side power supply voltage and the low-potential-side power supply voltage of the two current-mirror circuits and the P-type differential amplifier are respectively the voltage VDD and the voltage AGND. The output buffer is an inverter circuit including a P-type output transistor and an N-type output transistor. The voltage AGND is supplied to the source of the N-type transistor of the output buffer, and the control signal VCTL from the AGC circuit 40 is supplied to the source of the P-type transistor. Therefore, the output voltage of the output buffer can be changed by changing the control signal VCTL.

In FIG. 4B, a current I1 generated by a current source is supplied as an operating current I1' of the N-type differential amplifier through two current-mirror circuits. The voltage of the output node of the current-voltage converter 30 is supplied to the gate of one of a pair of N-type differential transistors of the N-type differential amplifier as the input signal IN. The reference voltage VR0 is supplied to the gate of the other N-type differential transistor of the N-type differential amplifier. The output voltage of the N-type differential amplifier is supplied to an output buffer. The output signal from the output buffer is supplied to one end of the first switching element SW1.

The high-potential-side power supply voltage and the low-potential-side power supply voltage of the two current-mirror circuits and the N-type differential amplifier are respectively the voltage VDD and the voltage AGND. The output buffer is an inverter circuit including a P-type output transistor and an N-type output transistor. The voltage AGND is supplied to the source of the N-type transistor of the output buffer, and the control signal VCTL from the AGC circuit 40 is supplied to the source of the P-type transistor. Therefore, the output voltage of the output buffer can be changed by changing the control signal VCTL.

In FIGS. 4A and 4B, a substrate bias effect can be prevented by applying the control signal VCTL as the substrate potential of the P-type output transistor of the output buffer.

Configuration Example and Operation of Comparator Having Output Current Limiting Function A configuration which implements the output current limiting function of the comparator 50 and its operation are described below.

A power supply voltage VDD is supplied to the comparator 50 as the high-potential-side power supply. The analog power supply voltage AGND is supplied to the comparator 50 as the low-potential-side power supply. The output current limiting function of the comparator 50 is a function of limiting a current flowing through the current path connected to at least one of the high-potential-side power supply and the low-potential-side power supply.

Figure 5:
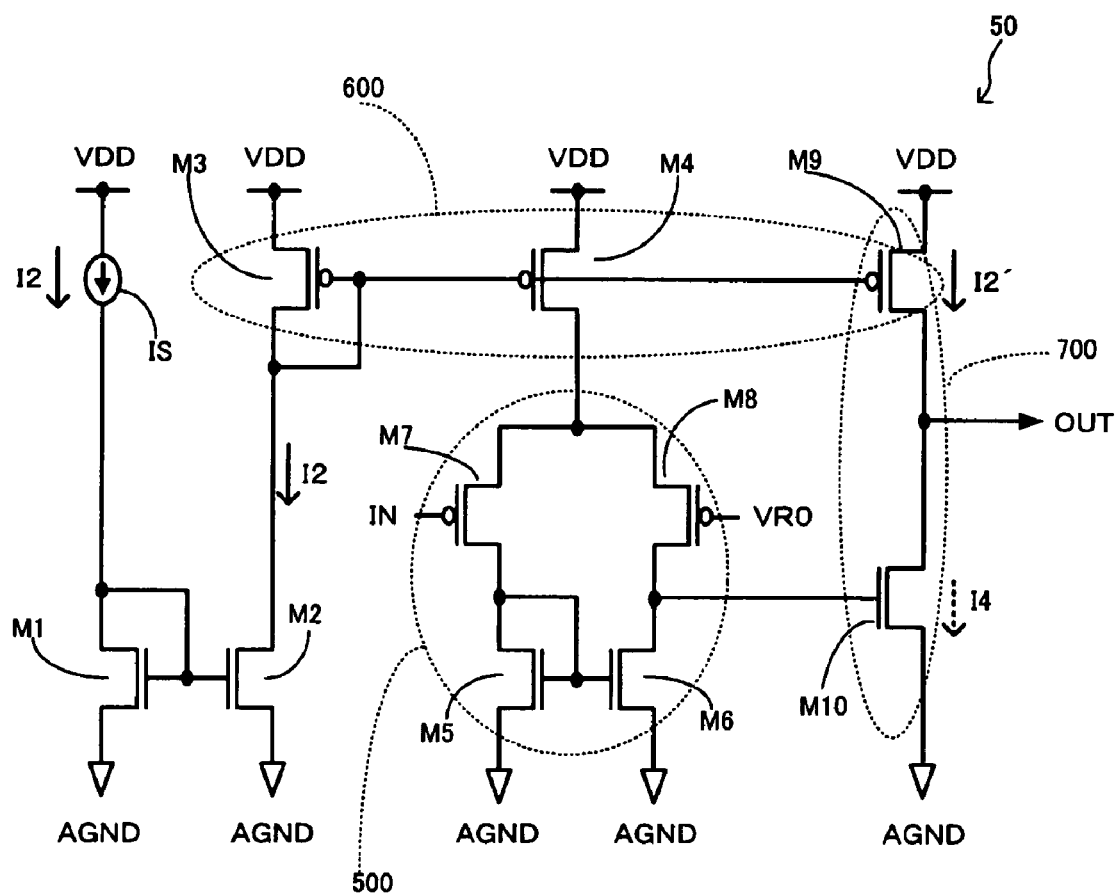
FIG. 5 is a circuit diagram showing a configuration example of a comparator.

FIG. 5 is a circuit diagram showing a configuration example of the comparator 50 shown in FIG. 3. The voltage of the output (OUT) of the comparator 50 shown in FIG. 5 swings to the maximum between the power supply voltages (VDD and AGND). However, the amount of current of the output (OUT) is limited so that an excessive current is not supplied to the vibrator 12.

As shown in FIG. 5, the comparator 50 includes a current source IS, NMOS transistors (M1 and M2) forming a current mirror, and PMOS transistors (M3, M4, and M9) forming a current mirror 600. The PMOS transistor M3 is an input-side transistor of the current mirror 600, and the PMOS transistors (M4 and M9) are output-side transistors of the current mirror 600. The PMOS transistor M4 operates as a current source which supplies an operating current to a comparator circuit 500. The PMOS transistor M9 forms part of an output-stage circuit 700.

The comparator 50 further includes four transistors (M5 to M8) forming the comparator circuit 500 which compares a signal (IN) in the oscillation loop with a reference voltage (VR0) and outputs a voltage signal corresponding to the comparison result.

The two PMOS transistors (M7 and M8) form a differential pair. The voltage of the output node of the current-voltage converter 30 (i.e., signal in the oscillation loop) is supplied to the gate of the PMOS transistor M7 as the input signal (IN). The reference voltage (VR0) is supplied to the gate of the PMOS transistor M8. The NMOS transistors (M5 and M6) forming a current mirror operate as a load (current mirror load) of the differential pair formed of the two PMOS transistors (M7 and M8).

The comparator 50 further includes the output-stage circuit 700 including the output high-potential power supply (VDD) side PMOS transistor (first output transistor) and the low-potential power supply (AGND) side NMOS transistor (second output transistor). The signal (OUT) indicating the comparison result is output from the output-stage circuit 700.

As shown in FIG. 5, the current source IS generates a current I2. The current source IS is a constant current source, for example. In this case, the current I2 is a constant current. The current I2 is used to generate an input current of the current mirror 600.

In FIG. 5, when the ratio of the transistor size of the NMOS transistors (M1 and M2) forming the current mirror is 1:1, the drain current of the NMOS transistor M2 is I2. The current I2 serves as the input current of the current mirror 600.

The output-stage circuit 700 includes the P-type output driver transistor (first output transistor) M9 and the N-type output driver transistor (second output transistor) connected in series between the power supply voltage VDD and the analog power supply voltage AGND. The output voltage (OUT) is output from the common connection node of each transistor (drains of the PMOS transistor M9 and the NMOS transistor M10). The output voltage (OUT) is supplied to one end of the second switching element (SW2) shown in FIG. 1.

A feature of this configuration is that the high-potential power supply side transistor (M9) of the output-stage circuit 700 also serves as the output-side transistor of the current mirror 600.

The drain current of the high-potential power supply side transistor (M9) of the output-stage circuit 700 is the current I2'. The amount of current I2' is determined depending on the current mirror ratio of the current mirror 600. The current I2' is equal to the current I2 when the current mirror ratio is 1:1.

Therefore, when the low-potential power supply side transistor (M10) is turned OFF as a result of the voltage comparison of the comparator circuit 500, the voltage of the comparator output (OUT) is almost equal to the voltage VDD while the current is limited to the current I2'. Specifically, the amount of current of the comparator output (OUT) is controlled by the amount of current I2 generated by the current source IS, whereby the current value can be limited.

When the low-potential power supply side transistor (M10) is turned ON as a result of the voltage comparison of the comparator circuit 500, if the drain current I4 of the transistor M10 is sufficiently larger than the current I2', the voltage of the comparator output (OUT) is almost equal to the voltage AGND while the current is equal to (I4−I2'). If the current I2' is sufficiently smaller than the current I4, I4−I2' is almost equal to I4.

In the comparator 50 shown in FIG. 5 having the above configuration, the high-potential-side current drive capability of the output voltage OUT is limited by the current I2'. The high-potential-side current drive capability is limited in FIG. 5 as compared with the configuration shown in FIGS. 4A and 4B in which the same signal is supplied to the gates of the P-type output transistor and the N-type output transistor forming the output buffer, for example. Note that the configuration of the comparator 50 is not limited to the configuration shown in FIG. 5.

An operation when driving the vibrator 12 using the rectangular-wave output of the comparator 50 is described below in detail.

The vibrator 12 is driven using the rectangular-wave output of the comparator 50. The rectangular wave contains a harmonic component in addition to the basic frequency component. However, since the vibrator 12 functions as a mechanical filter which allows only a resonance frequency component to pass through in a resonance state, a current due to the harmonic frequency component does not flow. Specifically, when the subsequent stage of the comparator 50 is the vibrator 12 (i.e., another current path does not exist between the comparator 50 and the vibrator 12), a current which flows through the vibrator 12 is equal to the current limited by the comparator 50 (i.e., limit-value current).

Specifically, when the vibrator 12 is in a resonance state, only a current at the resonance frequency flows through the vibrator 12. A current due to the harmonic component need not be taken into consideration in the resonance state. Therefore, a current which flows through the vibrator 12 is equal to the current supplied from the comparator having the output current limiting function.

Accordingly, the amount of current which flows through the vibrator 12 can be reliably controlled by providing the vibrator 12 in the subsequent stage of the comparator 50 (i.e., another current path is not formed between the comparator 50 and the vibrator 12) and limiting the amount of output current.

As described above, since the comparator 50 is configured to limit the amount of output current of the output-stage circuit 700, the vibrator is not destroyed even if the amplitude of the oscillation loop is not controlled using another circuit.

Therefore, the entire AGC circuit can be reliably turned OFF in the sleep mode, for example. This increases the effect of reducing power consumption in the sleep mode.

Figure 6:
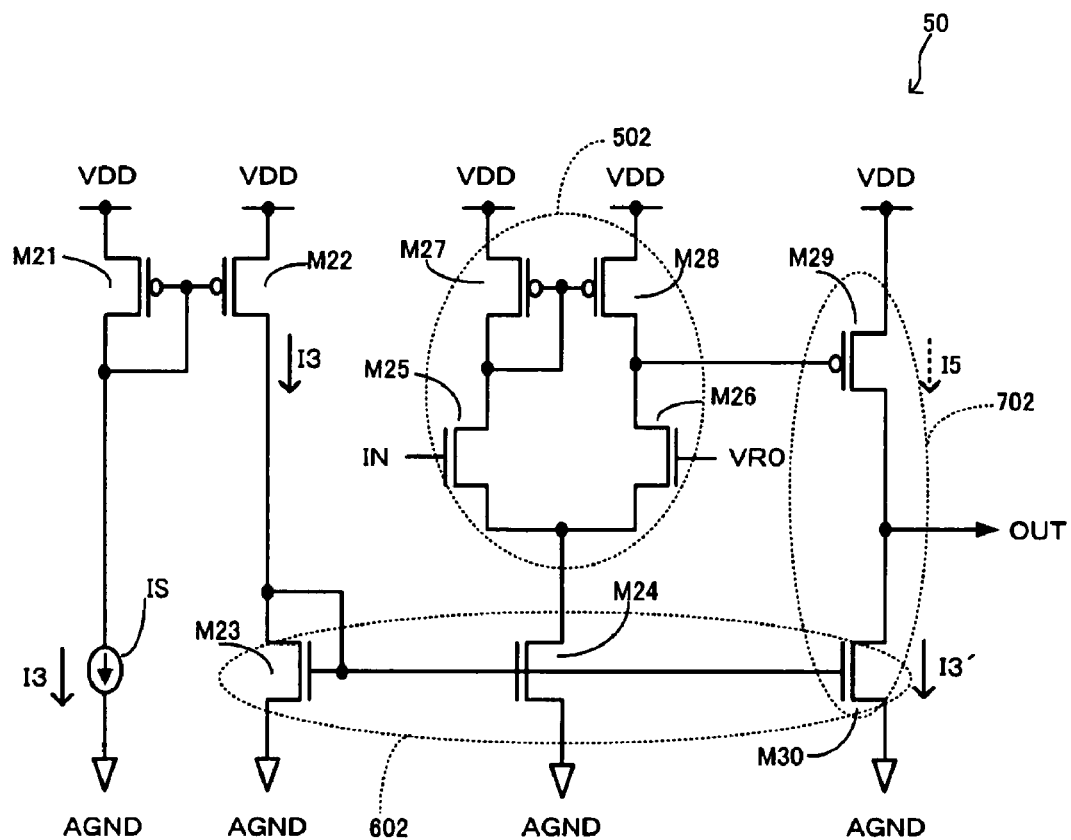
FIG. 6 is a circuit diagram showing another configuration example of the comparator.

FIG. 6 is a circuit diagram showing another configuration example of the comparator 50. The comparator 50 shown in FIG. 6 differs from the circuit shown in FIG. 5 as to the conductivity type of the transistor (i.e., the conductivity type is reversed). The comparator 50 shown in FIG. 6 has the same basic configuration as in FIG. 5.

Specifically, a current I3 generated by a current source IS is supplied as the operating current of an N-type differential amplifier using two current-mirror circuits. The drain current of an N-type output driver transistor (first output transistor) M29 is a current I3'.

The voltage of the output node of the current-voltage converter 30 is supplied to the gate of an NMOS transistor (M25) as the input signal IN. The reference voltage (VR0) is supplied to the gate of an NMOS transistor M26.

An output-stage circuit 702 includes a high-potential power supply side transistor (M29) and a low-potential power supply side transistor (M30).

In the comparator 50 shown in FIG. 6 having the above configuration, the drain current of the low-potential-side transistor M30 is limited to the current I3'. The low-potential-side current drive capability is limited in FIG. 6 as compared with the configuration shown in FIGS. 4A and 4B in which the same signal is supplied to the gates of the P-type output transistor and the N-type output transistor forming the output buffer, for example.

In FIGS. 5 and 6, a current flowing through the current path connected to at least one of the high-potential-side power supply and the low-potential-side power supply is limited. According to the configuration shown in FIG. 5 or 6, destruction of the vibrator due to overcurrent can be reliably prevented.

Note that a current flowing through the current paths connected to the high-potential-side power supply and the low-potential-side power supply may be limited. Specifically, the overcurrent prevention effect is further increased by limiting the current capability of each of the two transistors forming the output-stage circuit.

Figure 7:
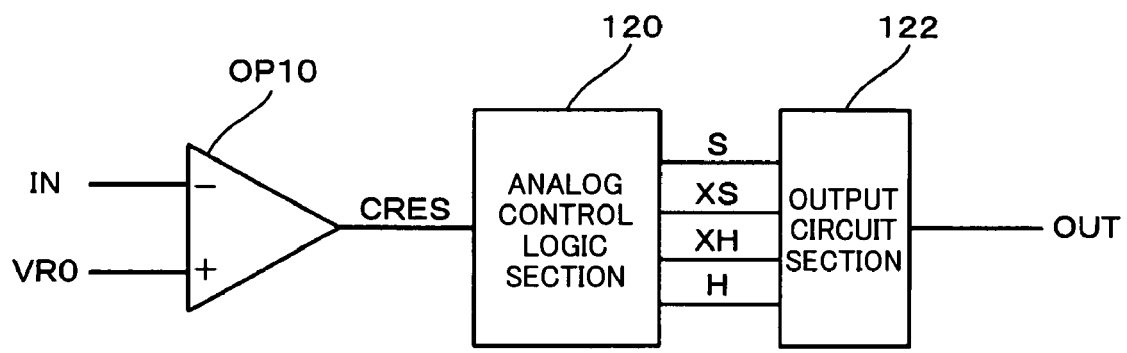
FIG. 7 is a circuit diagram showing still another configuration example of the comparator shown in FIG. 3.

FIG. 7 is a circuit diagram showing still another configuration example of the comparator 50 shown in FIG. 3.

In FIG. 7, the comparator 50 may include an operational amplifier OP10, an analog control logic section 120, and an output circuit section 122.

The operational amplifier OP10 functions as a comparator. The operational amplifier OP10 compares the output signal from the current-voltage converter 30 as the input signal with the reference voltage VR0, and outputs a comparison result signal CRES. The analog control logic section 120 generates control signals S, XS, XH, and H which control the output circuit section 122 based on the comparison result signal CRES generated by the operational amplifier OP10. The output circuit section 122 generates the output signal while limiting the current supplied from the high-potential-side power supply or the current supplied to the low-potential-side power supply based on the control signals S, XS, XH, and H from the analog control logic section 120.

Figure 8A:
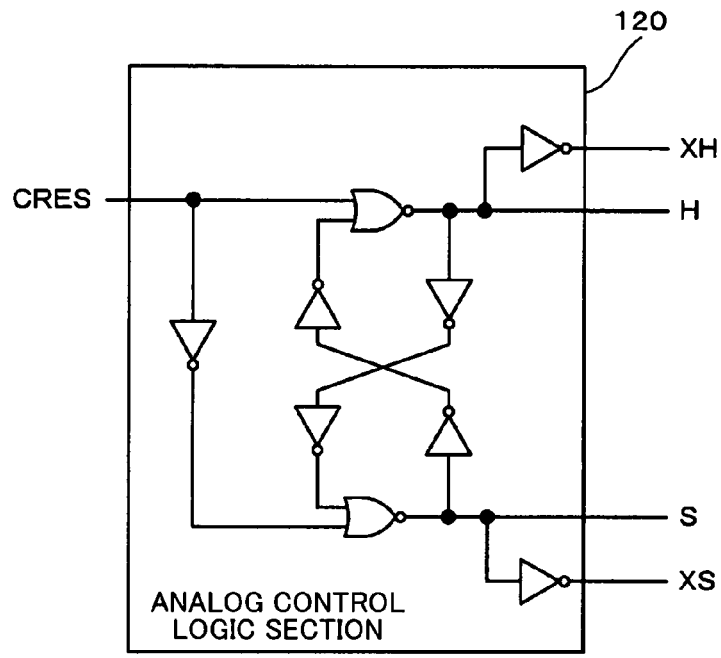
FIG. 8A is a circuit diagram showing a configuration example of an analog control logic section shown in FIG. 7.
Figure 8B:
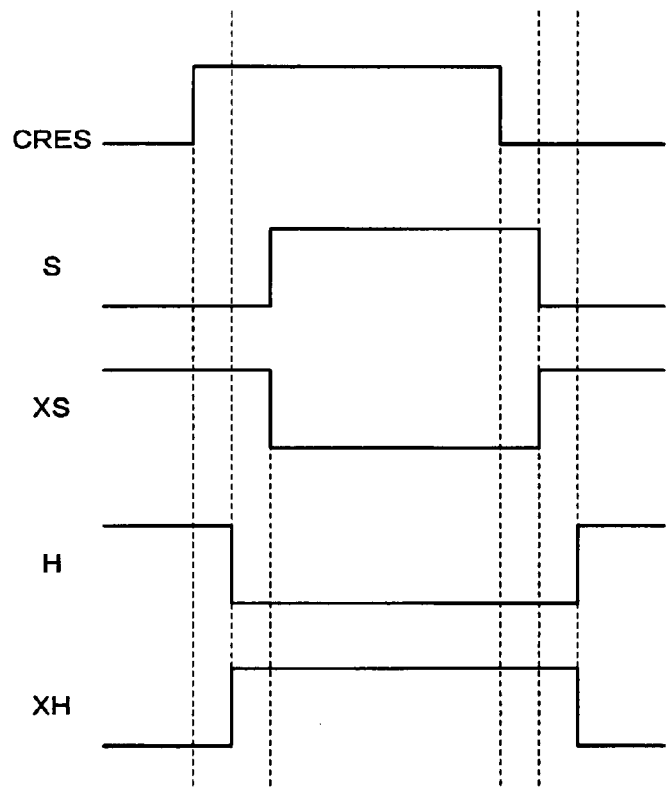
FIG. 8B is a timing diagram showing an operation example of the analog control logic section shown in FIG. 8A.

FIG. 8A is a circuit diagram showing a configuration example of the analog control logic section 120 shown in FIG. 7. FIG. 8B is a timing diagram showing an operation example of the analog control logic section 120 shown in FIG. 8A.

The analog control logic section 120 generates the control signals S and H based on the comparison result signal CRES so that the control signals S and H change at different timings. The control signal XS is an inversion signal of the control signal S. The control signal XH is an inversion signal of the control signal H. In FIG. 8A, the comparison result signal CRES and its inversion signal are respectively input to two-input, one-output NOR circuits.

The other input signal of the first NOR circuit is a signal generated by delaying the output signal from the second NOR circuit, and the other input signal of the second NOR circuit is a signal generated by delaying the output signal from the first NOR circuit. According to this configuration, the control signal H rises based on the falling edge of the control signal S, and the control signal S rises based on the falling edge of the control signal H.

Therefore, the control signals S and H are generated so that the H-level periods do not overlap. Likewise, the control signals XS and XH are generated so that the L-level periods do not overlap.

Figure 9:
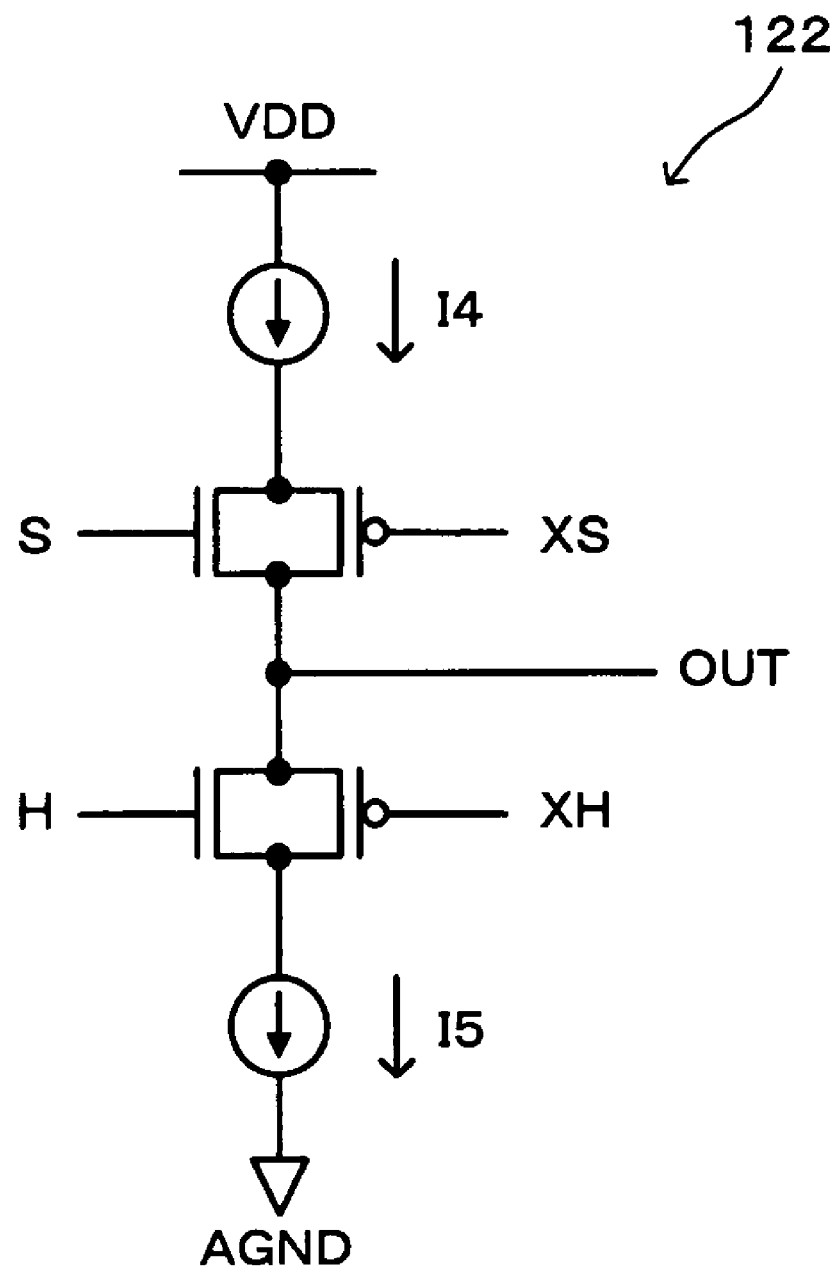
FIG. 9 is a view showing a configuration example of an output circuit section shown in FIG. 7.

FIG. 9 shows a configuration example of the output circuit section 122 shown in FIG. 7.

The output circuit section 122 includes first and second transfer gates, a first current source to which the power supply voltage VDD is supplied at one end and the first transfer gate is connected at the other end, and a second current source to which the second transfer gate is connected at one end and the analog power supply voltage AGND is supplied at the other end. The first current source generates a current I4. The second current source generates a current I5. The first and second transfer gates are connected in series, and the voltage of the connection node of the first and second transfer gates is output as the output voltage OUT of the comparator 50.

The control signals XS and S are respectively supplied to the gates of a P-type transistor and an N-type transistor forming the transfer gate connected with the first current source. The control signals XH and H are respectively supplied to the gates of a P-type transistor and an N-type transistor forming the transfer gate connected with the second current source.

The configuration of the oscillation driver circuit 10 is not limited to the configuration shown in FIG. 3. For example, the operation of the AGC circuit 40 is stopped (disabled) in the sleep mode. In this case, the voltage of each node of the AGC circuit 40 is variable. In particular, when the potential of the control signal VCTL is variable, the output signal from the GCA 20 also becomes variable.

Therefore, when the oscillation driver circuit 10 transitions to the normal mode from the sleep mode, the output signal from the GCA 20 becomes variable due to the control signal VCTL of which the level is variable.

As a result, the vibrator 12 produces driving vibrations using the variable output signal from the GCA 20. For example, when the vibrator 12 utilizes a piezoelectric effect, since the vibrator 12 operates in proportion to the charge supplied, the vibrator 12 may break due to an output signal which cannot be controlled. As a modification according to this embodiment, an output fixing transistor which fixes the output from the integrator 46 may be provided.

Another Configuration Example of Oscillation Driver Circuit

Figure 10:
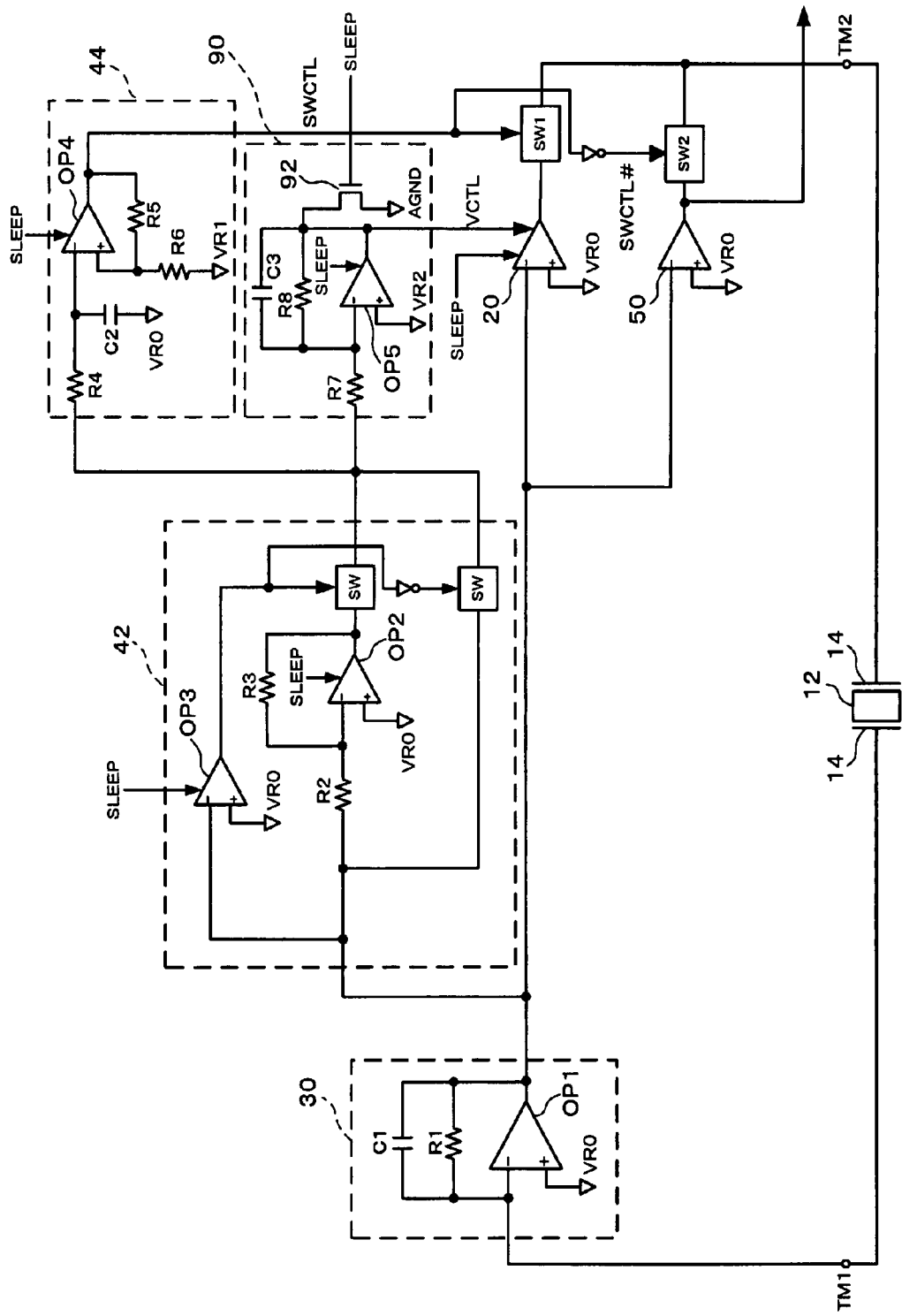
FIG. 10 is a circuit diagram showing another configuration example of the oscillation driver circuit shown in FIG. 1.

FIG. 10 is a circuit diagram showing another configuration example of the oscillation driver circuit 10 shown in FIG. 1. In FIG. 10, the same sections as in FIG. 3 are indicated by the same symbols. Description of these sections is appropriately omitted. The oscillation driver circuit shown in FIG. 10 differs from the oscillation driver circuit 10 shown in FIG. 3 in that an integrator 90 is provided instead of the integrator 46 shown in FIG. 3.

The integrator 90 has a configuration in which an output fixing transistor 92 is added to the integrator 46 shown in FIG. 3. The output fixing transistor 92 is formed of an N-type transistor. The output node of the operational amplifier OP5 is connected with the drain of the output fixing transistor 92, and the voltage AGND is supplied to the source of the output fixing transistor 92. The sleep control signal SLEEP is supplied to the gate of the output fixing transistor 92.

According to this configuration, the output fixing transistor 92 is set in a conducting state when the sleep control signal SLEEP is set at the H level so that the output node of the integrator 90 is set at the same potential as the voltage AGND.

Specifically, the control signal VCTL is generated so that the output level of the GCA 20 does not cause destruction of the vibrator 12 when the oscillation driver circuit 10 transitions to the normal mode (first operation mode) from the sleep mode (second operation mode), whereby the output or the gain of the GCA 20 is controlled. Since the potential of the control signal VCTL is fixed in this manner, the output signal from the GCA 20 does not become variable, even when the oscillation driver circuit 10 transitions to the normal mode from the sleep mode, whereby a situation in which the vibrator 12 breaks can be reliably prevented.

In FIG. 10, the output of the integrator is fixed by providing the output fixing transistor. Note that the invention is not limited to the configuration shown in FIG. 10.

Oscillation Conditions During Oscillation Startup and During Stable Oscillations The oscillation driver circuit (driver device) 10 shown in FIG. 1 drives a physical quantity transducer 12 by means of an oscillation loop. In the oscillation driver circuit 10 according to this embodiment, the loop gain is set to be larger than unity during oscillation startup in order to enable a high-speed startup. Specifically, the oscillation conditions during oscillation startup are satisfied when the loop gain is larger than unity and the phase in the loop is 360°×n (n is an integer).

The oscillation conditions during stable oscillations are satisfied when the loop gain is unity and the phase in the loop is 360°×n (n is an integer).

Power Supply Voltage of Oscillation Driver Circuit

The oscillation driver circuit 10 shown in FIG. 1 operates between the voltage VDD (high-potential power supply voltage) and the voltage AGND (low-potential power supply voltage). The voltage AGND is a ground potential, for example. Note that another reference potential may be used instead of the ground potential. Specifically, the power supply potential which may be used differs depending on the type of the vibrator 12.

When the vibrator 12 is a capacitive-coupling transducer (configuration in which a direct-current blocking capacitor lies in the signal path in the internal equivalent circuit), direct current is cut off. Therefore, with regard to the direct current level (bias point) of the oscillation loop, it suffices that the voltage amplitude of the driving signal of the oscillation loop be adjusted regardless of the circuit operation. Therefore, an arbitrary potential may be basically used as the low-potential-side power supply, for example.

When the vibrator 12 is a variable-resistance transducer, it is necessary to set the bias voltage of the oscillation loop at a desired level. Therefore, a reference voltage at a desired level is generally used.

The power supply method is classified into a single power supply method (method using only a positive power supply) and a dual power supply method (method using positive and negative power supplies). The latter method is used particularly when accuracy is important.

Note that the invention may employ either of the above power supply methods. In FIG. 1 (and other drawings), the vibrator 12 is a capacitive-coupling transducer as is clear from the equivalent circuits shown in FIGS. 12A and 12B. The above description has been given on the assumption that a single power supply method is employed and the oscillation driver circuit 10 operates between the voltage VDD (e.g. 5 V) and the voltage GND (ground potential).

Rectangular Wave Drive, Sine Wave Drive, and Capacitive-Coupling Vibrator

The driver device according to this embodiment shown in FIG. 1 may employ rectangular wave drive and sine wave drive.

Figure 12A:
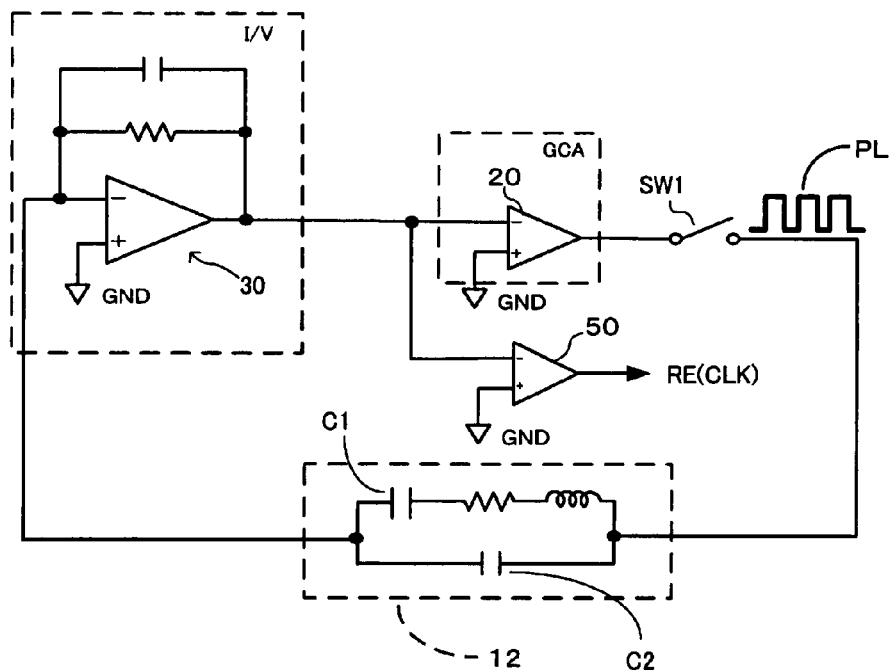
FIGS. 12A and 12B are circuit diagrams illustrative of rectangular wave drive, sine wave drive, and a capacitive-coupling vibrator.

FIG. 12A shows the major portion of the driver device which performs rectangular wave drive. As shown in FIG. 12A, the vibrator 12 is driven by a rectangular-wave driving signal (PL). The gain of the oscillation loop can be easily controlled by adjusting the high-level voltage or the low-level voltage of the driving signal (PL).

The rectangular-wave drive method has an advantage in that the variation in the driving signal (PL) is small. Moreover, since the voltage amplitude of the driving signal is easily controlled, the circuit configuration can be simplified, whereby the circuit scale can be reduced.

Figure 12B:
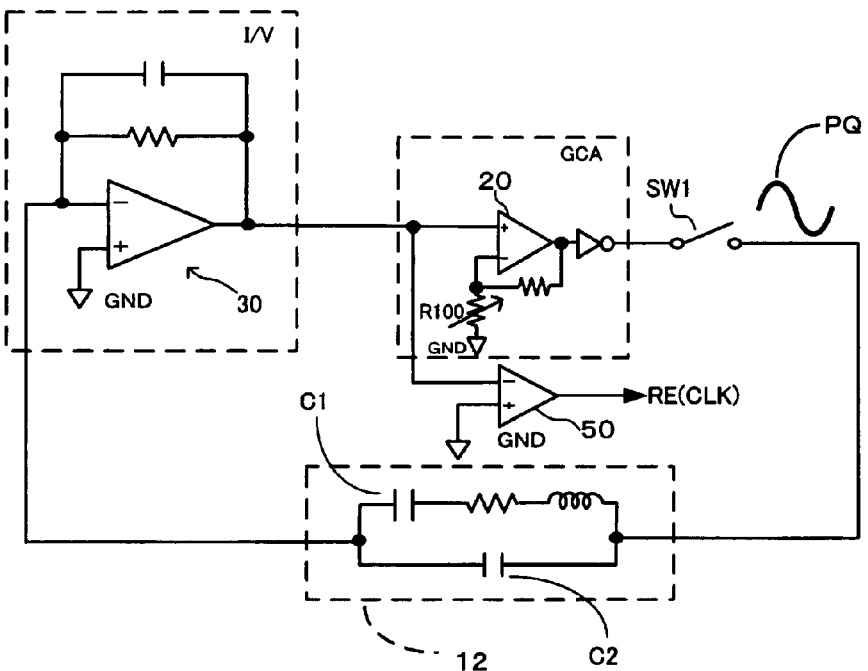

FIG. 12B shows the major portion of the driver device which performs sine wave drive. As shown in FIG. 12B, the vibrator 12 is driven by a sine-wave driving signal (PQ). The gain control amplifier (GCA) 20 controls the gain in the oscillation loop by variably controlling the resistance value of a variable resistor 100.

In FIGS. 12A and 12B, a capacitive-coupling vibrator is used as the vibrator 14. Note that the vibrator 14 is not limited thereto. Various vibrators such as a variable-resistance vibrator may also be used.

The capacitive-coupling vibrator (capacitive vibrator) is a vibrator in which a direct-current blocking capacitor (C1 and C2 in FIG. 12) lies in the signal path in the internal equivalent circuit. A piezoelectric element can be given as an example of the capacitive-coupling vibrator (capacitive vibrator).

When using the capacitive-coupling vibrator, an arbitrary potential may be used as the direct-current potential of the oscillation loop. Therefore, the degrees of freedom relating to the circuit configuration are increased.

Type of Vibrator

In this embodiment, a capacitive-coupling vibrator is used as the vibrator 12, as described above. Note that the vibrator 12 is not limited thereto. Various vibrators such as a variable-resistance vibrator may also be used.

The capacitive-coupling vibrator (capacitive vibrator) is a vibrator in which a direct-current blocking capacitor lies in the signal path in the internal equivalent circuit, as shown in FIGS. 12A and 12B. A piezoelectric element can be given as an example of the capacitive-coupling vibrator (capacitive vibrator).

When using the capacitive-coupling vibrator, an arbitrary potential may be used as the direct-current potential of the oscillation loop. Therefore, a circuit can be formed without taking the direct-current potential into account, whereby the degrees of freedom of the circuit configuration are increased.

Configuration and Operation of Vibrating Gyrosensor

Figure 11:
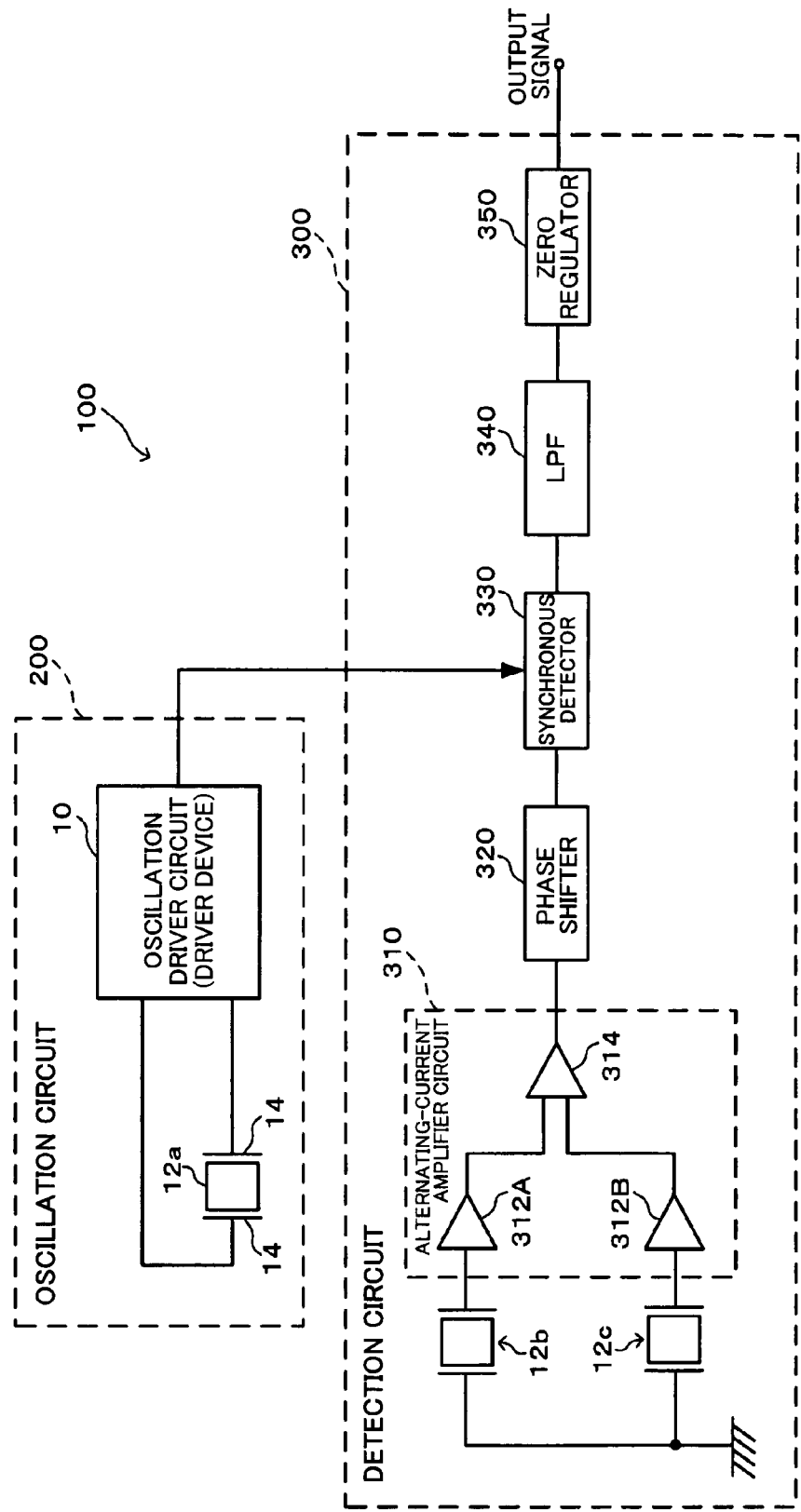
FIG. 11 is a block diagram showing a configuration example of a vibrating gyrosensor according to one embodiment of the invention.

FIG. 11 is a block diagram showing a configuration example of a vibrating gyrosensor to which the oscillation driver circuit according to this embodiment or its modification is applied.

In FIG. 11, the same sections as in FIG. 1 are indicated by the same symbols. Description of these sections is appropriately omitted.

A vibrating gyrosensor (physical quantity measuring device in a broad sense) 100 includes an oscillation circuit 200 and a detection circuit (detection device in a broad sense) 300. The oscillation circuit 200 includes the vibrator 12 and the oscillation driver circuit 10. The oscillation driver circuit 10 causes a driving vibration section 12a of the vibrator 12 to oscillate.

The amplitude of the signal subjected to frequency selection while passing through the vibrator 12a increases immediately after oscillation startup in the normal mode, whereby the oscillation detector 44 generates the switch control signal SWCTL set at the H level. This causes the oscillation loop to be switched so that the amplitude of the signal subjected to frequency selection while passing through the vibrator 12a is controlled by the GCA 20.

When most of the noise is cut off by the driving vibration section 12a and the output from the full-wave rectifier 42 is relatively small, the gain of the GCA 20 is increased so that the loop gain of the oscillation loop becomes unity.

Since the output from the full-wave rectifier 42 increases with the passage of time, the gain of the GCA 20 is reduced so that the loop gain becomes unity.

The vibrating gyrosensor is controlled in the sleep mode in the same manner as in the oscillation startup state in the normal mode.

When the oscillation state of the driving signal has been stabilized, signals from driving detection sections 12b and 12c of the vibrator 12 start to be detected. Specifically, the detection signals (alternating-current) from the driving detection sections 12b and 12c of the vibrator are amplified using alternating-current amplifiers 312A and 312B of an alternating-current amplifier circuit 310, and the outputs from the amplifiers 312A and 312B are summed up using an adder 314.

The output from the adder 314 is caused to pass through a phase shifter 320 to obtain a phase shift signal. The phase of the phase shift signal differs from the phase of the synchronous detection clock signal which is the output from the comparator 50 of the oscillation driver circuit 10 by a specific angle such as 90°.

The phase shift signal and the synchronous detection clock signal from the oscillation driver circuit 10 are input to a synchronous detector 330 to detect the output signal from the vibrator 12. As a result, unnecessary leakage signals are removed from the detected output signal or at least reduced. Since the phase can be adjusted according to a change in phase during the weak signal detection process by adjusting the phases of the synchronous detection clock signal and the detection signal using the detection circuit 300, a highly accurate phase adjustment can be achieved while preventing an increase in circuit scale.

The detected output signal is input to a low-pass filter 340, smoothed, and input to a zero regulator 350. The output from the zero regulator 350 is removed as an output signal corresponding to the physical quantity (e.g. angular velocity) to be measured.

The vibrating gyrosensor 100 shown in FIG. 11 is preferably provided in electronic instruments such as a video camera, a digital camera, a car navigation system, an aircraft, and a robot.

The invention is not limited to the vibrator 12 according to this embodiment. As examples of the material for the vibrator 12, constant modulus alloys such as elinvar and ferroelectric single crystals (piezoelectric single crystals) can be given. As examples of such single crystals, a rock crystal, lithium niobate, lithium tantalate, a lithium niobate-lithium tantalate solid solution, lithium borate, and langasite can be given.

It is preferable that the vibrator 12 be hermetically sealed in a package. It is preferable that the package be filled with dry nitrogen or be under vacuum.

The physical quantity measured according to the invention is not limited to the angular velocity illustrated in this embodiment. The invention aims at a physical quantity which can be detected from a change in vibration state using a detection circuit when the vibrator is caused to produce driving vibrations and the vibration state of the vibrator has changed due to the effects of the physical quantity on the vibrator producing driving vibrations.

As such a physical quantity, acceleration and angular acceleration are particularly preferred in addition to the angular velocity applied to the vibrator. As the detection device, an inertial sensor is preferred.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A driver device which is connected with a vibrator to form an oscillation loop and causes the vibrator to produce driving vibrations when measuring a physical quantity using an output signal obtained by synchronously detecting a detection signal output from the vibrator, the driver device comprising:
   a gain control amplifier which causes the vibrator to produce the driving vibrations by controlling an oscillation amplitude in the oscillation loop; and
   a comparator which generates a synchronous detection reference signal based on a signal in the oscillation loop;
   the driver device causing the vibrator to produce vibrations using an output from the comparator in a state in which a gain in an oscillation loop formed by the vibrator and the comparator is set to be larger than unity, and then causing the vibrator to produce the driving vibrations by controlling an oscillation amplitude in an oscillation loop formed by the vibrator and the gain control amplifier; and
   the comparator having an output current limiting function.

2. The driver device as defined in claim 1,
   wherein, when the driver device is set in a first operation mode for performing a normal operation, the driver device causes the vibrator to produce vibrations using the output from the comparator in a state in which the gain in the oscillation loop formed by the vibrator and the comparator is set to be larger than unity, and then causes the vibrator to produce the driving vibrations by controlling the oscillation amplitude in the oscillation loop formed by the vibrator and the gain control amplifier; and
   wherein, when the driver device is set in a second operation mode for performing a sleep operation, the driver device causes the vibrator to produce the driving vibrations in the oscillation loop formed by the vibrator and the comparator.

3. The driver device as defined in claim 2, comprising:
   a gain control circuit which controls a gain of the gain control amplifier based on an oscillation signal in the oscillation loop;
   wherein, when the driver device is set in the second operation mode, the driver device disables the operations of the gain control amplifier and the gain control circuit without disabling the operation of the comparator.

4. The driver device as defined in claim 2, wherein the output of the gain control amplifier is controlled to have an output level which does not cause destruction of the vibrator when the driver device transitions to the first operation mode from the second operation mode.

5. The driver device as defined in claim 1, comprising:
   an oscillation detector which detects a signal from the vibrator;
   wherein the driver device switches the oscillation loop from the oscillation loop formed by the vibrator and the comparator to the oscillation loop formed by the vibrator and the gain control amplifier based on the detection result of the oscillation detector.

6. The driver device as defined in claim 5, wherein the driver device switches the oscillation loop from the oscillation loop formed by the vibrator and the comparator to the oscillation loop formed by the vibrator and the gain control amplifier on condition that the oscillation detector has detected that a direct-current voltage obtained by converting a current flowing through the vibrator has reached a given threshold voltage.

7. The driver device as defined in claim 1, wherein the driver device causes the vibrator to produce the driving vibrations using the output from the comparator when the oscillation loop is formed by the vibrator and the comparator, and uses the output from the comparator as a synchronous detection clock signal for generating the output signal when the oscillation loop is formed by the vibrator and the gain control amplifier.

8. The driver device as defined in claim 1, wherein the polarity of the output from the gain control amplifier with respect to a reference potential is the same as the polarity of the output from the comparator with respect to the reference potential.

9. The driver device as defined in claim 1, wherein, when the comparator is connected with a high-potential-side power supply and a low-potential-side power supply, the output current limiting function is a function of limiting a current flowing through a current path connected to at least one of the high-potential-side power supply and the low-potential-side power supply.

10. The driver device as defined in claim 9,
wherein the comparator having the output current limiting function includes:
an output-stage circuit including a high-potential power supply side first output transistor and a low-potential power supply side second output transistor;
a comparator circuit which compares a signal in the oscillation loop with a given reference voltage and drives the second output transistor using an output indicating the comparison result;
a current-mirror circuit which includes the first output transistor as a constituent element; and
a current source circuit which generates an input current of the current-mirror circuit; and
wherein the first output transistor operates as an output-side transistor of the current-mirror circuit, whereby the amount of current flowing through the first output transistor is controlled by the current generated by the current source circuit.

11. The driver device as defined in claim 9,
wherein the comparator having the output current limiting function includes:
an output-stage circuit including a high-potential power supply side first output transistor and a low-potential power supply side second output transistor;
a comparator circuit which compares a signal in the oscillation loop with a given reference voltage and drives the first output transistor using an output indicating the comparison result;
a current-mirror circuit which includes the second output transistor as a constituent element; and
a current source circuit which generates an input current of the current-mirror circuit; and
wherein the second output transistor operates as an output-side transistor of the current-mirror circuit, whereby the amount of current flowing through the second output transistor is controlled by the current generated by the current source circuit.

12. The driver device as defined in claim 1,
wherein the vibrator is a capacitive-coupling vibrator; and
wherein the gain control amplifier causes the vibrator to produce the driving vibrations by applying a rectangular-wave driving signal to the vibrator.

13. A physical quantity measuring device for measuring a physical quantity corresponding to a detection signal output from a vibrator based on driving vibrations produced by the vibrator and the physical quantity to be measured, the physical quantity measuring device comprising:
a vibrator;
the driver device as defined in claim 1 which causes the vibrator to produce driving vibrations; and
a detection device which detects an output signal corresponding to the physical quantity based on the detection signal, the detection device including a synchronous detector which synchronously detects the detection signal based on the output from the comparator.

14. The physical quantity measuring device as defined in claim 13, wherein the detection device includes a phase shifter which adjusts phases of the output from the comparator and the detection signal.

15. An electronic instrument comprising the physical quantity measuring device as defined in claim 13.

\* \* \* \* \*

UNITED STATES PATENT AND TRADEMARK OFFICE
CERTIFICATE OF CORRECTION

| | | |
|---|---|---|
| PATENT NO. | : 7,812,681 B2 | Page 1 of 1 |
| APPLICATION NO. | : 11/907483 | |
| DATED | : October 12, 2010 | |
| INVENTOR(S) | : Masahiro Kanai et al. | |

It is certified that error appears in the above-identified patent and that said Letters Patent is hereby corrected as shown below:

Title Page, Item (73)

Please change the name of the Assignee from:

"(73)   Assignee:    Seiko) Epson Corporation, Tokyo (JP)"

to:

--(73)   Assignee:    Seiko Epson Corporation, Tokyo (JP)--

Signed and Sealed this
Eighth Day of February, 2011

David J. Kappos
*Director of the United States Patent and Trademark Office*